United States Patent [19]

Noguchi et al.

[11] Patent Number: 5,338,135
[45] Date of Patent: Aug. 16, 1994

[54] DRILL AND LOCK SCREW EMPLOYED FOR FASTENING THE SAME

[75] Inventors: Kazuo Noguchi; Yoshikatsu Mori; Nagatoshi Kunimori; Hideo Mori, all of Hyogo, Japan

[73] Assignee: Sumitomo Electric Industries, Ltd., Osaka, Japan

[21] Appl. No.: 865,966

[22] Filed: Apr. 9, 1992

[30] Foreign Application Priority Data

| Apr. 11, 1991 | [JP] | Japan | 3-079057 |
| Apr. 11, 1991 | [JP] | Japan | 3-079058 |
| Apr. 11, 1991 | [JP] | Japan | 3-079059 |
| Apr. 11, 1991 | [JP] | Japan | 3-079060 |
| Oct. 15, 1991 | [JP] | Japan | 3-083382[U] |
| Nov. 8, 1991 | [JP] | Japan | 3-091721[U] |

[51] Int. Cl.$^5$ .................................. B23B 51/02
[52] U.S. Cl. ...................... 408/233; 408/200; 408/223; 408/227; 408/713
[58] Field of Search ............... 408/200, 223, 224, 227, 408/228, 231, 233, 713

[56] References Cited

U.S. PATENT DOCUMENTS

| 930,436 | 8/1909 | Thomas | 408/233 |
| 2,237,901 | 4/1941 | Chun | 408/223 |
| 2,360,385 | 10/1944 | Anderson | 408/223 |
| 2,400,856 | 5/1946 | Thompson | 408/233 |
| 2,621,548 | 12/1952 | Williams | 408/233 |
| 4,493,596 | 1/1985 | Grunsky et al. | 408/233 |
| 4,984,944 | 1/1991 | Pennington, Jr. | 408/227 |

FOREIGN PATENT DOCUMENTS

| 118806 | 9/1984 | European Pat. Off. | 408/231 |
| 2646528 | 4/1978 | Fed. Rep. of Germany . | |
| 2654400 | 6/1978 | Fed. Rep. of Germany | 408/200 |
| 2317989 | 2/1977 | France . | |
| 256466 | 5/1988 | German Democratic Rep. | 409/234 |
| WO89/08520 | 9/1989 | PCT Int'l Appl. . | |
| 123605 | 3/1919 | United Kingdom | 408/223 |
| 519475 | 3/1940 | United Kingdom | 408/223 |

*Primary Examiner*—Daniel W. Howell
*Attorney, Agent, or Firm*—W. G. Fasse

[57] ABSTRACT

A drill has a pair of cutting edges (4) which are arranged at positions that are substantially uniformly circumferentially spaced about its rotation axis. Each of the cutting edges (4) has a first linear cutting region (4a) and a second linear cutting region (4b) which are aligned with each other on the same straight line, and a curved cutting region (4c) which is located between the first and second linear cutting regions (4a, 4b). The curved cutting region (4c) has a third linear cutting region (4e, 4f) which extends in a direction intersecting with the second linear cutting region (4b) at a prescribed angle. With this structure, it is possible to prevent chip loading etc. which may be caused during perforation drilling operations. In a throw-away tipped drill, a notch (118a) is formed in a received portion of an insert (110) which is mounted on a shank (130). A holding portion (131a, 131b, 133a, 133b) of the shank (130) corresponding to the notch (118a) is provided with a through screw hole (138). A male screw (139) is inserted in the through screw hole (138), and a spherical pressing member (140) is interposed between the forward end of the male screw (139) and the surface of the notch (118a) of the insert (110). With this structure, it is possible to prevent separation of the insert (110) from the shank (130).

23 Claims, 24 Drawing Sheets

FIG. 18
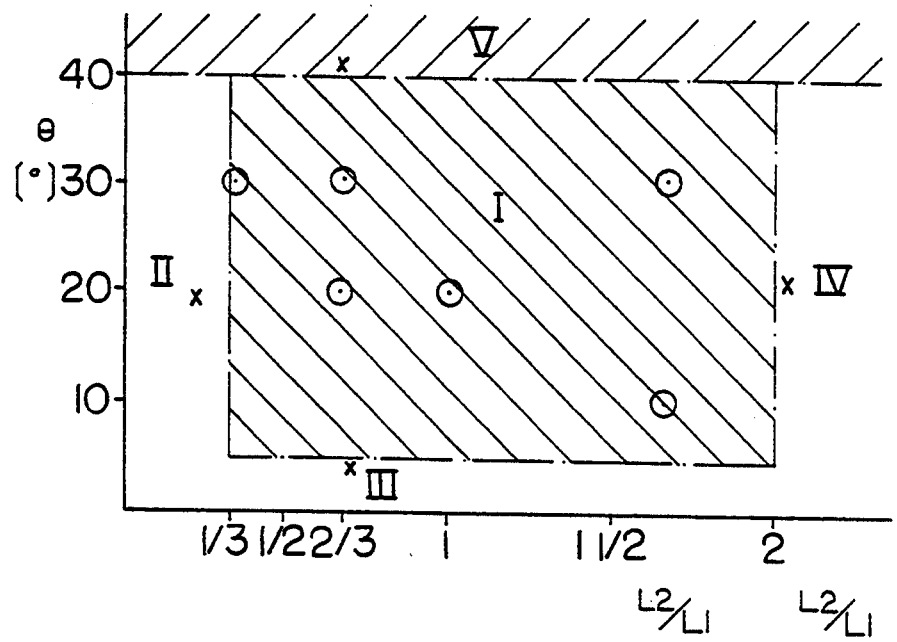
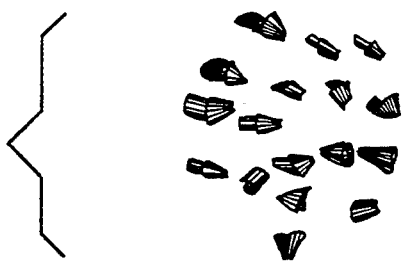
FIG. 19A
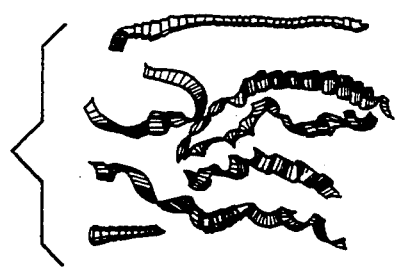
FIG. 19B
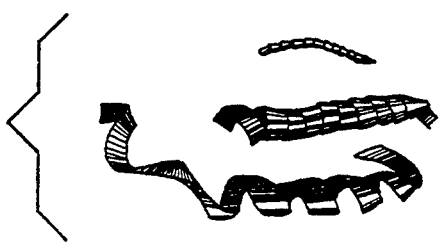
FIG. 19C
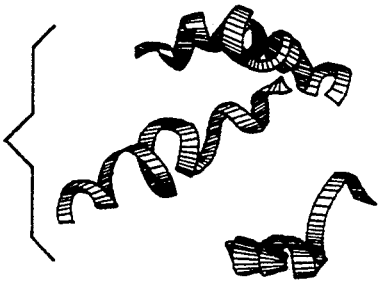
FIG. 19D

| FORM | INVENTIVE SAMPLE | CONVENTIONAL SAMPLE HAVING NICKS | CONVENTIONAL SAMPLE | f = 0.1 mm/rev f = 0.15 mm/rev f = 0.1 mm/rev    ← TIME    0.3 HP

POWER ↑
0.3 HP
TIME ←
f = 0.15 mm/rev

DRILL AND LOCK SCREW EMPLOYED FOR FASTENING THE SAME

BACKGROUND OF THE INVENTION

1. Field of the Invention

The present invention relates to the structure of a drill which is mainly employed for piercing, and more particularly, it relates to improvements in the tip configuration, strength etc. of a drill. The invention further relates to an improvement in the structure of the connection between an insert and a shank of a throw-away tipped drill, and the structure of a lock screw which is employed for fastening the insert to the shank.

2. Description of the Background Art

A drill is one type of cutting tool which is employed for piercing steel products or the like. FIG. 1 shows an exemplary structure of a conventional twist drill 30. This twist drill 30 is formed by a cutting portion 31 which is employed for piercing, and a shank 32, which does not perform cutting but is mainly employed for discharging chips, to be mounted in a chuck of a cutting machine such as a drilling machine.

FIG. 2 shows the forward end of such a twist drill 30. A pair of cutting edges 33 are arranged at positions that are substantially uniformly circumferentially spaced about the rotation axis of the drill 30. These cutting edges 33 linearly extend from ends of a chisel edge 34 toward the outer circumference of the drill 30.

FIG. 3 shows another exemplary structure of a conventional spade drill 40. This spade drill 40 is formed by a shank 41 and a cutting portion 42 which is fixed to the shank 41 by a mounting pin 43. FIG. 4 shows the forward end of the cutting portion 42. The cutting portion 42 of the space drill 40 has the general shape of a flat plate. The forward end of this cutting portion 42 is formed by a pair of symmetrically provided cutting edges 44, which linearly extend from a central portion toward both edges of the cutting portion 42. The drill 40 is further provided on its surfaces, serving as flanks, with slit-type nick grooves 45 extending in a direction substantially perpendicular to the cutting edges 44.

In the conventional twist and spade drills 30 and 40, the cutting edges 33 and 44 that directly contribute to cutting a workpiece are linearly shaped as shown in FIGS. 2 and 4. When such drills are employed for piercing, chips are continuously formed in widths corresponding to the widths of the linear cutting edges. Continuous formation of such wide chips leads to problems such as chip loading in a drilled hole and chip winding on the drill.

Thus, the slit-type nick grooves 45 are formed in the linear cutting edges 44 as shown in FIG. 4, to reduce the chip widths. Namely, the chips are parted at the nick grooves 45, to be reduced in width. However, the chips thus reduced in width are disadvantageously increased in length since the same are liberated from the inner wall of the drilled hole and a groove of the drill. Such long chips may cling to the drill to extremely deteriorate chip controllability.

In using a conventional drill having such linear cutting edges, the drilled hole may become loaded with the chips and chip controllability may be deteriorated by clinging of such chips. Particularly in the case of deep hole drilling, chip loading disadvantageously causes breakage of the drill.

Further, the conventional drill, such as the twist drill shown in FIG. 1, for example, is not provided with any chip breaker. Thus, long chips that are formed during piercing drilling are wound on the drill or cling to the same, to cause problems in automation and availability for piercing drilling operations. While the spade drill shown in FIG. 3 may be provided with a chip breaker having a grinder, the application range of such a breaker is too narrow to attain a sufficient effect in practice.

A drill is an expendable item having a limited life due to wear or breakage during drilling operations. In consideration of economy, therefore, it is preferable to employ a drill such as the spade drill 40, in which only the cutting portion 42 is exchangeable, for example. However, the cutting portion 42 of the conventional spade drill 40 is fixed by the mounting pin 43. Thus, working accuracy may be reduced by a backlash in mounting, and the drill 40 may be broken due to insufficient mounting strength.

Further, the conventional drill also has the following problem: As shown in FIGS. 2 or 4, the drill is generally provided on its tip with a region called a chisel edge 34 or 46. Since such a chisel edge increases cutting resistance and receives a large thrust during cutting work, this portion may be ground out by thinning so that its edge width is reduced.

On the other hand, the inventors have developed a self-grip type drill as described below, and tried to thin the tip of its cutting portion by means of a conventional thinning technique. FIG. 5 is a plan view of the drill developed by the inventors showing a cutting portion 51, which is thinned in a conventional manner, and FIG. 6 is a front elevational view showing the cutting portion 51. A thinned surface 52 defined by the conventional thinning method is shaped as a curved surface along a cylindrical side surface from a chisel edge 53 toward a rear portion of the tip. The width of the chisel edge 53 is defined by a radius $R_1$ formed on the upper end of the thin surface 52. If this radius $R_1$ is increased, then the roundness in a central portion of a tip 54 as well as the width of the chisel edge 53 are also increased, which deteriorates the sharpness of the drill. If the radius $R_1$ is reduced, on the other hand, a radius $R_2$ of the thinned surface 52 formed in the rear portion of the tip is also reduced although sharpness of the drill is improved, which defines a relatively steep inflection surface in the rake face of the drill in the form of a groove. This causes stress concentration in the vicinity of the thinned surface 52 and reduces the strength of the drill.

SUMMARY OF THE INVENTION

An object of the present invention is to provide a drill having a tip configuration which is excellent in chip controllability, for preventing chip loading and clinging of chips to the drill.

Another object of the present invention is to provide a drill having a chip breaker, which is improved in chip controllability.

Still another object of the present invention is to provide a drill which is excellent in economy and has sufficient tool strength.

A further object of the present invention is to provide a drill subjected to thinning, which is improved in tip sharpness and capable of maintaining its strength.

A further object of the present invention is to provide a throw-away tipped drill having a structure that can prevent separation of an insert from a shank.

A further object of the present invention is to provide a throw-away tipped drill having a shank structure that can prevent chip loading during piercing.

A further object of the present invention is to provide a lock screw having a ball, which is suitably employed for ensuring connection between an insert and a shank of a throw-away tipped drill.

A drill according to the present invention has on its forward end a pair of first and second cutting edges that extend substantially from the center of the rotation axis toward the outer circumferential edge of the drill to be arranged at positions that are substantially uniformly circumferentially spaced about the rotation axis. Each of the first and second cutting edges has first and second linear cutting regions, which are aligned with each other on the same straight line, and a curved cutting region, which is formed between the first and second linear cutting regions.

According to the present invention, the curved cutting region is so provided between the first and second linear cutting regions as to change chips from elongated flat plate shapes to shapes corrugated in perpendicular sections along the longitudinal direction. Such chips are friable and easily broken while they are also increased in deformation resistance. Thus, the chips are finely crushed and prevented from loading in a drilled hole and clinging to the drill.

A drill according to another aspect of the present invention has on its forward end a pair of cutting edges that extend substantially from the center of the rotation axis toward the outer circumferential edge of the drill to be arranged at positions that are substantially uniformly circumferentially spaced about the rotation axis of the drill. Further, a rake face of the drill has a projection for breaking chips.

The chips formed along the rake face are brought into contact with the projection, which is provided on the rake face of the drill, so that the direction of chip formation is deflected. Thus, the chips are brought into contact with the surface of a workpiece or the inner wall of the drilled hole, to be finely broken. Therefore, it is possible to prevent formation of elongated chips and to suppress clinging of such chips to the drill.

A drill according to still another aspect of the present invention comprises an insert for cutting a workpiece and a shank to be mounted on a prescribed position of a cutting machine. The shank has on its forward end a cavity for receiving the insert and a holding portion for holding the same. The insert has a held portion, which is received in and held by the cavity of the shank, and a tip portion, which has an outer diametrical width corresponding to the diameter of a hole to be drilled and has on its forward end surface a pair of cutting edges, which are arranged at positions that are substantially uniformly circumferentially spaced about the rotation axis of the drill. This insert, as a whole, is in the form of a substantially T-shaped flat plate. An angular portion connecting the held portion and the tip portion of the insert with each other is generally shaped as a circular arc.

According to the present invention, the held portion is inserted into the cavity of the shank under pressure, so that the insert is fixed to the shank. Thus, a position for mounting the insert onto the shank is automatically defined. Further, the angular portion between the held portion and the tip portion of the insert is generally shaped as a circular arc, whereby the angular portion is not subjected to any stress concentration caused by external force that is applied to the drill during cutting work, so that no cracking is caused.

A drill according to still another aspect of the present invention has on its forward end a pair of cutting edges that extend substantially from the center of the rotation axis and are arranged at positions that are substantially uniformly circumferentially spaced about the rotation axis, and a thinning surface formed in a rake face in the vicinity of a chisel edge. The thinning surface has a curved region along a truncated-conical side configuration, which is supposed to be reduced in diameter toward the tip of the drill.

As to the configuration of a curved surface that is formed by thinning, different conditions are required for a tip portion and a rear portion of the tip. In the tip portion a configuration is required that reduces its roundness as well as the chisel edge width, thereby improving sharpness. On the other hand, the rear portion of the tip must be formed with a relatively large curvature so that the thinning surface is provided with a gradual or gentle configuration change. According to the present invention, therefore, the thinning surface is formed in a configuration along the side surface of a truncated cone while the radius of curvature of the tip portion is reduced as compared with that of the rear portion of the tip, thereby satisfying the aforementioned conditions.

A throw-away tipped drill according to the present invention comprises an insert for cutting a workpiece, and a shank to be mounted on a prescribed position of a cutting machine. The insert is separably mechanically connected to the shank. Further, the insert has a received portion to be received in the shank, which in turn has a holding portion for receiving and holding the received portion of the insert. An engaging member is provided between the insert and the shank to be engaged with the same, thereby preventing separation of the insert that is received in the shank.

In a preferred embodiment of the present invention, the engaging member comprises a cavity formed in the received portion of the insert and an engaging piece formed in the holding portion of the shank to be engaged with the cavity of the insert. This engaging piece has a male screw which is screwed into a threaded through hole provided in the holding portion of the shank to press against the surface of the cavity of the insert.

According to the present invention, the insert and the shank are connected with each other by the engaging member. When external force acts in a direction that would tend to separate the insert from the shank, therefore, separation of the insert is prevented against such external force by the engaging member.

In a throw-away tipped drill according to another aspect of the present invention, the shank has a chip discharge surface that is continuous to a rake face of the insert to axially extend along the shank. The chip discharge surface has a further surface portion that is retracted from the rake face reversely to the rotational direction of the drill. According to this structure, chips that are formed along the rake face of the insert are smoothly discharged along the chip discharge surface, whereby it is possible to prevent the chips from clinging to the shank.

A lock screw according to the present invention, which is suitable as engaging means for the insert and the shank of the throw-away tipped drill, has a cylindrical configuration having a male screw threading on its outer peripheral surface and a washer groove on its forward end. The washer groove is rotatably engageable with a ball, which is pressed against a member to be fixed. The washer groove has in its bottom side a tapered hole, which is rearwardly reduced in diameter, and which forms a continuation of the washer groove. The washer groove further has on its forward end an expanding slot, which circumferentially divides the washer groove and the tapered hole.

By means of the lock screw having the aforementioned structure, the ball is pushed into the tapered hole when the lock screw is screwed into a screw hole of a fixed portion to press a contact surface of the forward end of the ball against the counter material. Thereby the washer groove provided in the forward end of the lock screw and the tapered hole are expanded in diameter due to a wedge effect, whereby the screw comes into pressure contact with the inner surface of the screw hole. Thus, the lock screw is prevented from reverse rotation by frictional force caused at this pressure contact point, whereby natural looseness is eliminated.

The contact pressure between the lock screw and the inner surface of the screw hole is not increased until the ball strikes the counter material, so that the screw hole is not damaged. Further, the washer groove and the tapered hole are prevented from excess expansion since the screw hole serves as a regulating or limiting surface, whereby the male screw is not damaged even if excess screw torque is applied.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a graph illustrating the correlation between parameters showing the geometry of the insert;

FIGS. 19A, 19B, 19C and 19D show photographs showing the shapes of chips formed by perforation with drills in regions I, II, III and IV of the graph illustrated in FIG. 18;

FIGS. 30D1, 30D2, 30D3, 30E1, 30E2 and 30E3 are drawings representing photographs showing states of chips resulting from a cutting test comparing the second embodiment of the present invention to a comparative drill at different feed rates;

DESCRIPTION OF THE PREFERRED EMBODIMENTS

A first embodiment of the present invention is now described in detail with reference to FIGS. 7 to 9.

Figure 1:
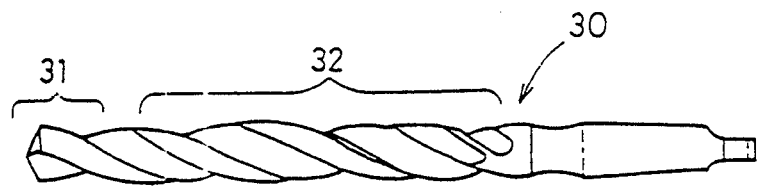
FIG. 1 is a front elevational view showing a conventional twist drill.
Figure 2:
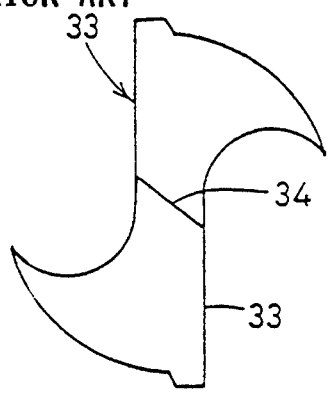
FIG. 2 illustrates the tip configuration of the twist drill shown in FIG. 1.
Figure 3:
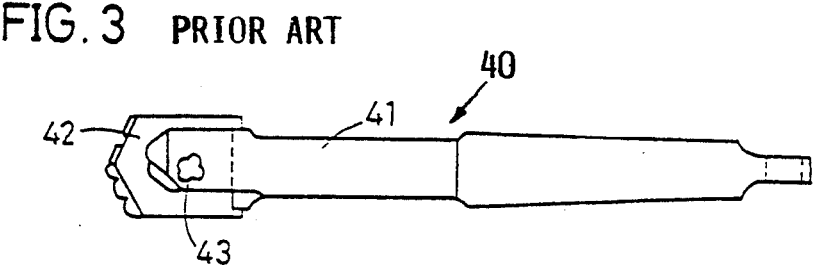
FIG. 3 is a front elevational view showing a conventional spade drill.
Figure 4:
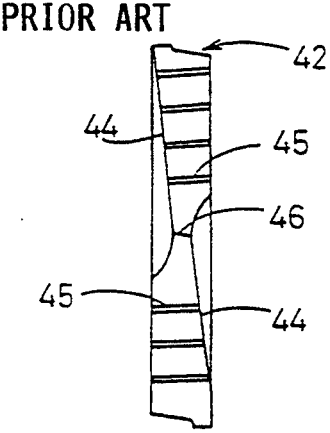
FIG. 4 illustrates the tip configuration of the spade drill shown in FIG. 3.
Figure 5:
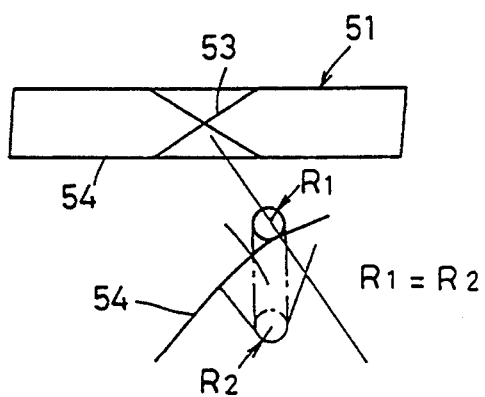
FIG. 5 is a top plan view showing a throw-away tipped drill whose cutting portion is thinned in a conventional method.
Figure 6:
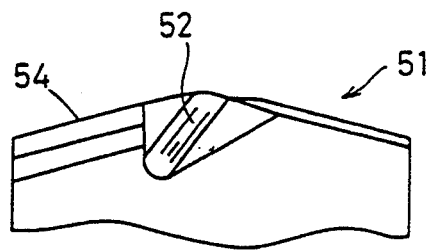
FIG. 6 is a partially fragmented front elevational view of the drill shown in FIG. 5.
Figure 7:
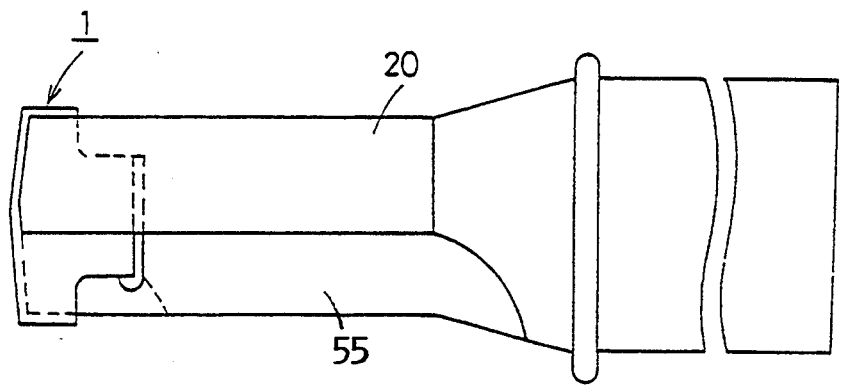
FIG. 7 is a front elevational view showing a throw-away tipped drill according to a first embodiment of the present invention.
Figure 8:
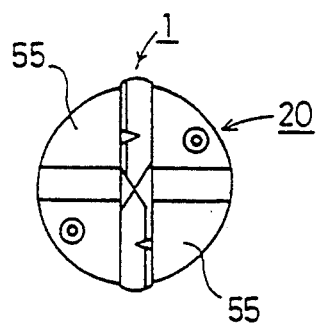
FIG. 8 is a left side elevational view of the drill shown in FIG. 7.

FIG. 7 is a front elevational view showing a throw-away tipped drill according to the first embodiment of the present invention, and FIG. 8 is a left side elevational view thereof. This throw-away tipped drill is formed by an insert 1 for cutting a workpiece such as a steel product, and a shank 20, which holds the insert 1, for mounting the drill onto a cutting tool. FIG. 9 is an exploded perspective view showing a method of connecting the insert 1 with the shank 20. Referring to FIG. 9, held surfaces 2 of the insert 1 are brought into contact with holding portions 21 of the shank 20, so that the insert 1 is fixed to the shank 20 by the resulting frictional force. Such a connection system for the insert 1 and the shank 20 is called a self-grip system.

Figure 14A:
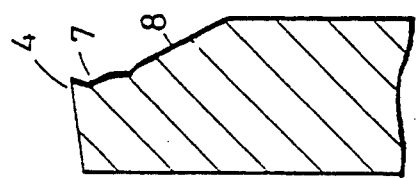
FIGS. 14A, 14B, 14C and 14D are sectional views of the insert taken along the lines A—A, B—B, C—C and D—D in FIG. 10 respectively.
Figure 14B:
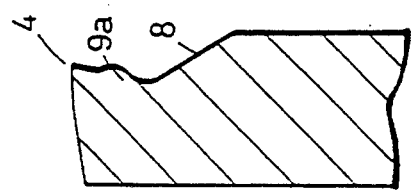
Figure 14C:
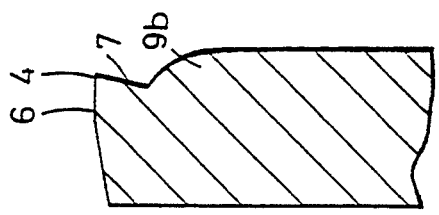
Figure 14D:
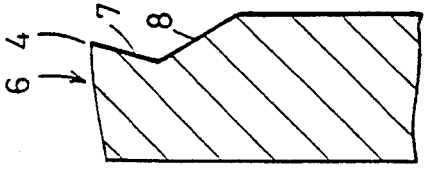
Figure 15:
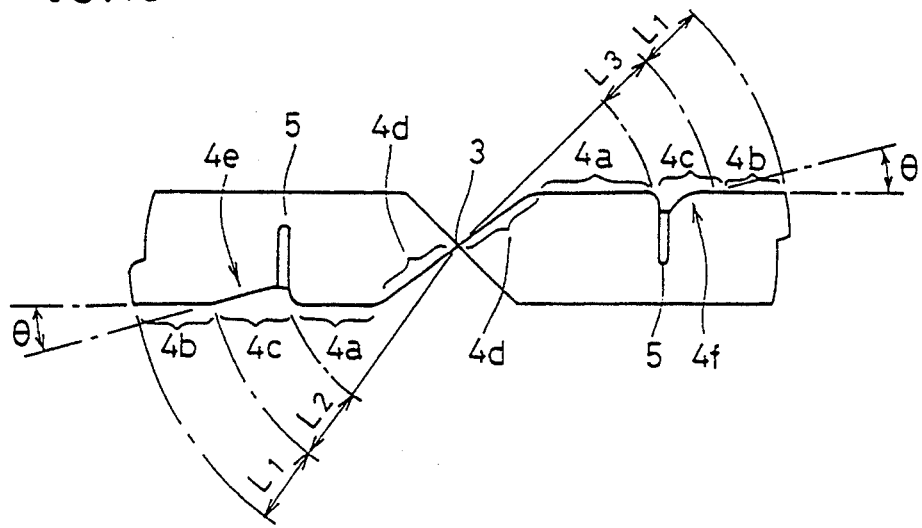
FIG. 15 is a top plan view showing the tip configuration of the insert shown in FIG. 10.

The structure of the insert 1 is now described with reference to FIGS. 10 to 13 and 14A to 14D. FIGS. 10, 11, 12 and 13 are respectively a front elevational view, a plan view, a bottom plan view and a left side elevational view showing the insert 1. FIGS. 14A, 14B, 14C and 14D are sectional views taken along the lines A—A, B—B, C—C and D—D in FIG. 10 respectively. Referring to these figures, the insert 1 is formed by a tip portion 15, which includes cutting edges 4, and a held portion 16, which is held by the holding portions 21 of the shank 20, as a substantially T-shaped flat plate. The tip portion 15 is provided with flanks 6 of the drill on its forward end surface and with rake faces 7 of the drill on its side portions. Two cutting edges 4 of the drill are formed along the respective two intersection lines between the respective flank 6 and the rake face 7. The cutting edges 4 are arranged at positions that are substantially uniformly circumferentially spaced about the rotation axis of the drill passing through the center of a chisel edge 3. That is to say, the cutting edges 4 are substantially equally circumferentially spaced from each other about the drill rotation axis, here for example at 180° spacings. FIG. 15 is a top plan view showing the configurations of the cutting edges 4. Each of the cutting edges 4 is formed by a first linear cutting region 4a, to a curved cutting region 4c and a second linear cutting region 4b successively from the center of the chisel edge 3 toward the outer circumferential region of the drill. A cutting central region 4d is formed by thinning between each respective first linear cutting region 4a and the chisel edge 3. The first and second linear cutting regions 4a and 4b are aligned with each other on the same straight line. The first and second linear cutting regions 4a and 4b of one cutting edge 4 are in parallel with those of the other cutting edge 4. The curved cutting regions 4c have third linear cutting regions 4e and 4f respectively. The third linear cutting regions 4e and 4f intersect with the second linear cutting regions 4b at an intersection angle θ respectively. Both end portions of the third linear cutting regions 4e and 4f are respectively connected to the first and second linear cutting regions 4a and 4b through smooth curved regions. The respective curved cutting regions 4c of the pair of cutting edges 4 have configurations that are different from each other, having different widths, for example. Referring to FIG. 15, widths $L_2$ and $L_3$ of the two curved cutting regions 4c are different from each other. As to further details of the configurations of the cutting edges 4, preferable sizes of the respective regions obtained through various experiments are described later.

As shown in FIG. 15, the pair of cutting edges 4 are provided with the curved cutting regions 4c, to form chips having shapes in relation to those of the cutting edges 4. Such chips are easily broken when they come into contact with the drill or the inner wall of a drilled hole. Thus, the chips are finely broken, and chip controllability is improved.

Figure 16:
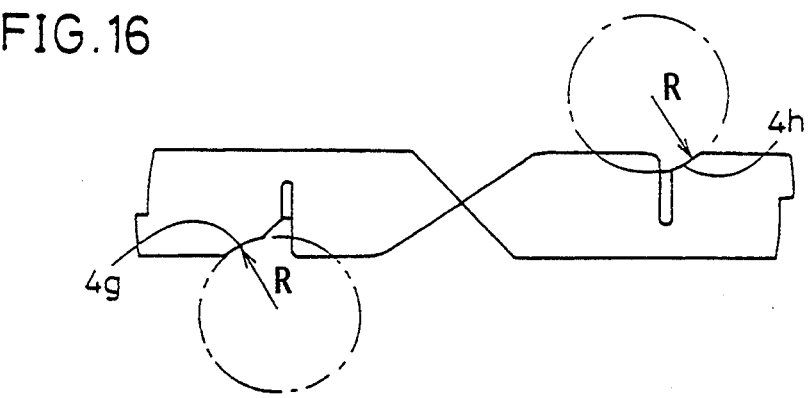
FIG. 16 is a plan view showing the tip configuration of another insert.

FIG. 16 is a top plan view showing a modification of the cutting edges 4. Curved cutting regions 4c of the cutting edges 4 here include curved regions 4g and 4h, which are formed by parts of circular arcs having radii R, instead of the third linear cutting regions 4e and 4f shown in FIG. 15.

Figure 17:
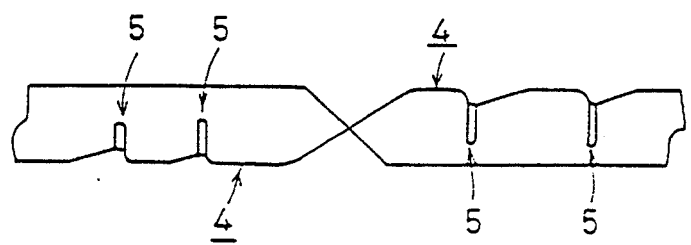
FIG. 17 is a plan view showing the tip configuration of still another insert.

FIG. 17 is a top plan view showing another modification of the cutting edges 4. Each of the cutting edges 4 shown in FIG. 17 has two curved cutting regions and three linear cutting regions. The configurations shown in FIG. 15 or 16 can be applied to the plurality of curved cutting regions.

Nick portions or grooves are now described. Referring to FIGS. 10, 11 and 15 to 17, slot-shaped nicks 5 are formed in the flanks 6 of the insert 1 to extend in the flanks 6 from the curved cutting regions 4c formed along the edges of the rake faces 7. Referring to FIG. 15, for example, the nicks 5 are so provided in the curved cutting regions 4c that chips formed by the first and second linear cutting regions 4a and 4b are divided or separated at the nicks 5 across the directions of formation thereof, and discharged. Thus, it is possible to reduce the chip widths.

Figure 10:
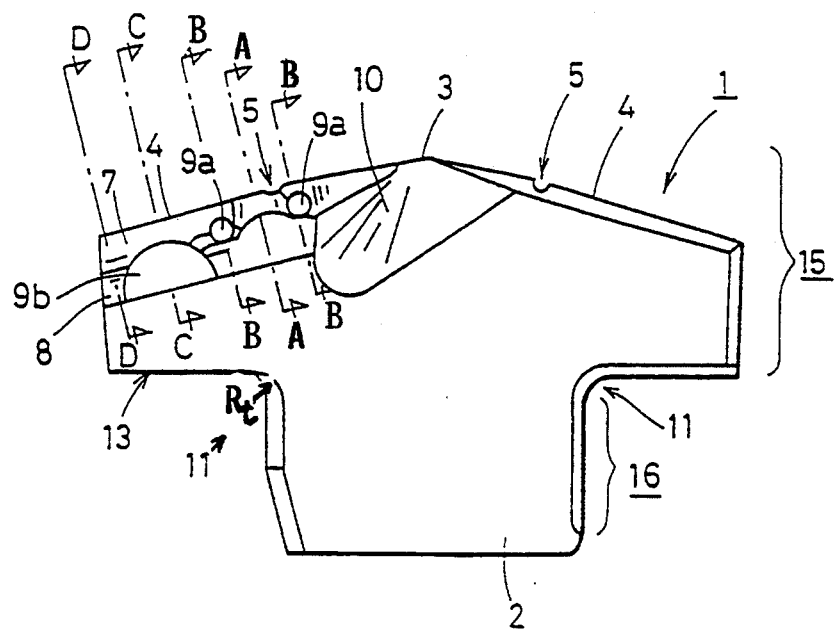
FIG. 10 is a front elevational view showing the insert of the throw-away tipped drill according to the first embodiment of the present invention on a larger scale.
Figure 11:
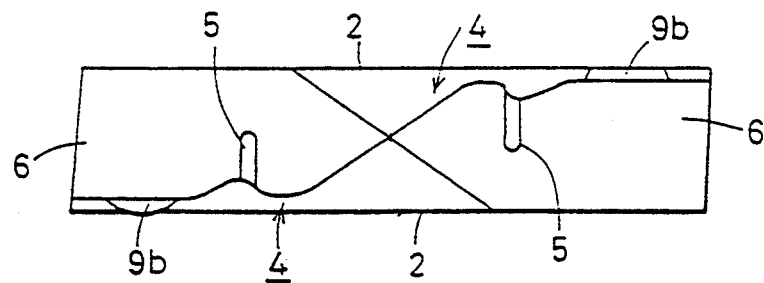
FIG. 11 is a top plan view of the insert shown in FIG. 10.
Figure 12:
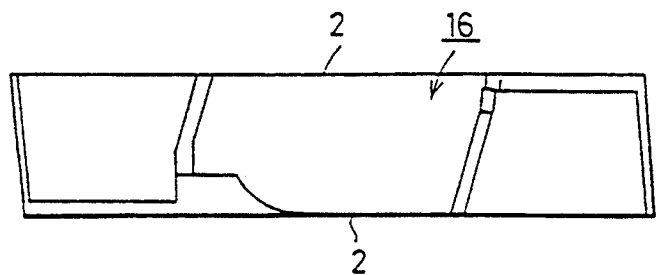
FIG. 12 is a bottom plan view of the insert shown in FIG. 10.
Figure 13:
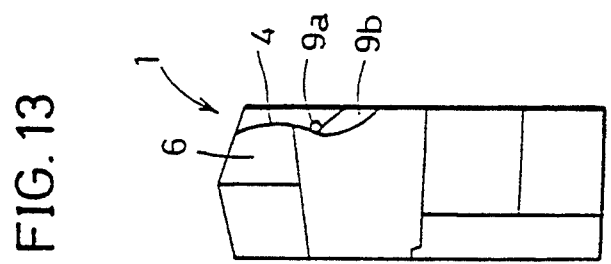
FIG. 13 is a left side elevational view of the insert shown in FIG. 10.

Chip breakers of the insert 1 of the drill shown in FIG. 10 are now described. The insert 1 is provided on its side surfaces with chip breaking surfaces 8 in continuation to the rake faces 7. As shown in FIG. 14D, each chip breaking surface 8 is formed in constant inclination with respect to each rake face 7. Further, each rake face 7 is provided with two first chip breakers 9a which are formed by two spherical projections, while each chip breaking surface 8 is provided with a second chip breaker 9b formed by a spherical projection which is larger than the first chip breakers 9a.

Thinning configurations of the insert 1 are now described. Referring to FIG. 10, thinning surfaces 10 are formed in the rake face sides of the pair of cutting central regions 4d about the center of the chisel edge 3. The thinning surfaces 10 define parts of a side surface of a cone of which the pointed projecting end is directed toward the center of the chisel edge 3. Such thinning configurations, defining parts of the side surface of the cone, are adapted to reduce curvatures of the cutting central regions 4d in the chisel sides while reducing the chisel width, thereby improving sharpness of the drill. Further, curvatures of tip rear sides are increased to improve strength of the insert 1.

The outer configuration of the insert 1 is now described. Referring to FIGS. 9 and 10, the held portion 16 is held between the holding portions 21 of the shank 20 by a wedge effect, so that the insert 1 is fixed to the shank 20. A pair of surfaces 13 of the insert 1 which is fixed to the shank 20, are supported by respective support surfaces 21a of the holding portions 21 of the shank 20. A thrust that is applied from the forward end of the insert 1 to the center of the rotation axis during cutting work is received by the support surfaces 21a of the shank 20. Namely, a work thrust acts on the insert 1 against a portion of the insert in proximity to the center of the rotation axis substantially passing through the center of the chisel edge 3, and a support reactive force is applied to the pair of surfaces 13 as a reactive force of the work thrust. In such a loaded state, it is apprehended that a throat 11 between the tip portion 15 and the held portion 16 may be cracked by stress concentration. Therefore, the throat 11 is provided with a radius $R_t$ of curvature, while the holding portions 21 of the shank 20 are also curved in positions corresponding to the throat 11.

FIGS. 18 and 19 show the results of a drill performance test for perforating workpieces using the drill shown in FIGS. 10 and 15 while changing the sizes of the respective portions 4a, 4b, 4c and 4d of each cutting edge 4. FIG. 18 shows the correlation between the various parameters $L_1$ to $L_3$ and $\theta$ defining the configuration of each cutting edge 4 shown in FIG. 15. The angle $\theta$ is shown along the vertical axis of the graph and the length ratios $L_2/L_1$ and $L_3/L_1$ are both shown along the horizontal axis. As shown in FIG. 18, it has been proved that the configuration of a cutting edge that exhibits excellent chip controllability resides in a hatch-marked region I. Referring to FIG. 15, it is preferable that ratios $L_2/L_1$ and $L_3/L_1$ of the respective curved cutting region 4c (of widths $L_2$ and $L_3$) relative to the respective second linear cutting region 4b (of width $L_1$) are in a range of ⅓ to 2 and definitely is at least 0.25 and not more than 3, and the angle $\theta$ formed between the third linear cutting region 4e or 4f and the second linear cutting region 4b is in a range of 5° to 40°. FIG. 19 shows configurations of chips formed in this region I and those in regions II to IV in FIG. 18. Namely, FIG. 19A shows finely broken chips produced by a drill bit with a configuration within region I of FIG. 18. FIGS. 19B, 19C and 19D respectively show ships produced by a drill bit in regions II, III and IV. It is clearly understood that chips are finely broken by the drill in the region I as compared with those in other regions.

Figure 20:
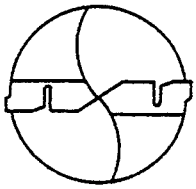
FIG. 20 illustrates the configurations of samples employed for a test for comparing the drill according to the first embodiment of the present invention with conventional drills.

The drill according to the embodiment of the present invention was compared with conventional drills. FIG. 20 shows the configurations of sample drills employed in such a comparison test, and Table 1 shows test conditions.

TABLE 1

| Workpiece | S50C |
|---|---|
| Cutting Speed | V = 60 m/min. |
| Feed Rate | f = 0.05 to 0.15 mm/rev. |
| Drilled Hole | $\phi$22 × 38 mm in depth |
| Cutting Liquid | emulsion type |

Figure 21A:
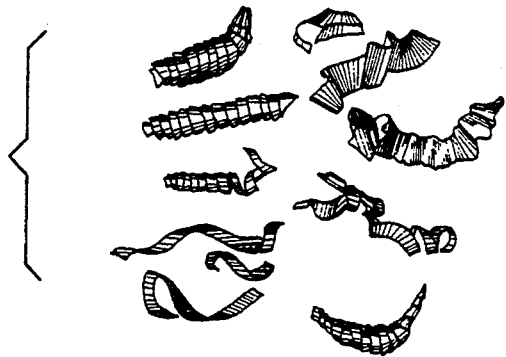
FIGS. 21A, 21B and 21C are drawings representing photographs of chips formed in the cutting test for comparing the drill according to the first embodiment of the present invention with the conventional drills.
Figure 21B:
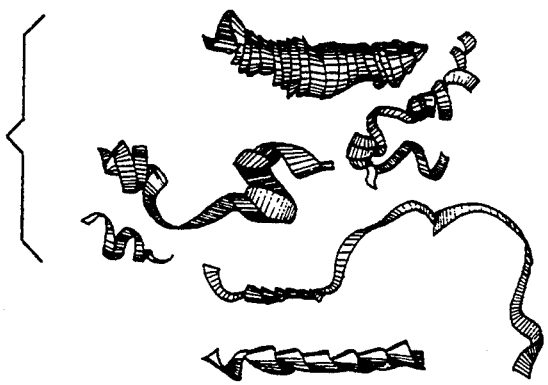
Figure 21C:
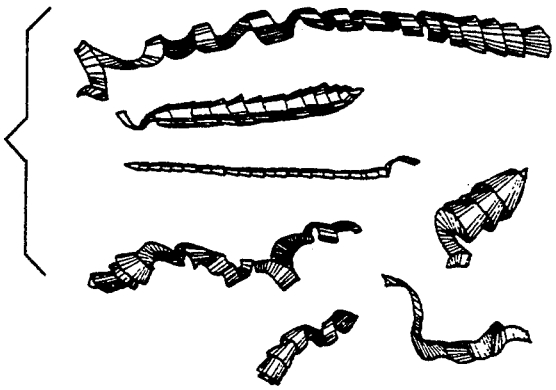
Figure 22A:
FIGS. 22A, 22B and 22C are drawings representing photographs similar to those in FIGS. 21A, 21B and 21C in another comparison cutting test made at another feed rate.
Figure 22B:
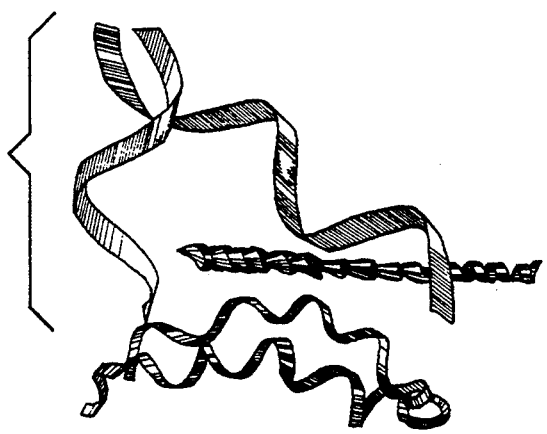
Figure 22C:
Figure 23A:
FIGS. 23A, 23B and 23C are drawings representing photographs similar to those in FIGS. 21A, 21B and 21C in still another comparison test made at still another feed rate.
Figure 23B:
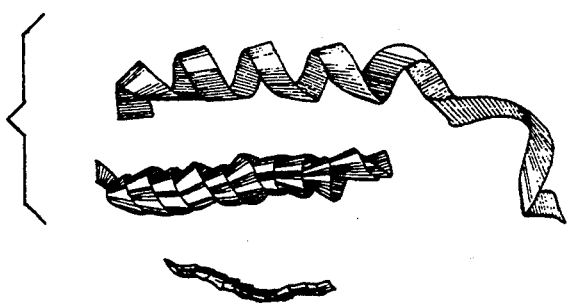
Figure 23C:
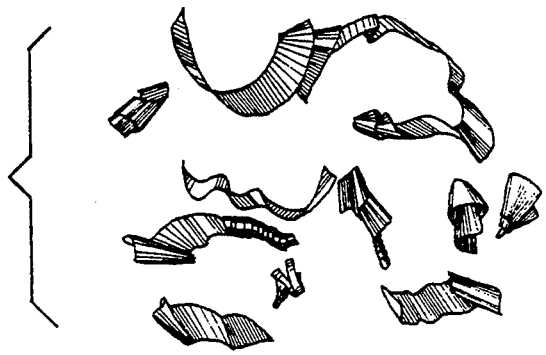

In this test, the inventive sample A, a conventional sample B having straight cutting edges and nicks, and another conventional sample C having straight cutting edges with no nicks were employed for perforating workpieces at feed rates of three stages. FIGS. 21, 22 and 23 show the shapes of chips resulting from such perforation respectively. Thus, FIGS. 21A, 21B and 21C show chips produced respectively by inventive drill sample A, conventional drill B and conventional drill C, all at a feed rate of f=0.05 mm/rev. Similarly, FIGS. 22A, 22B and 22C show chips produced by the respective drills at a feed rate of f=0.1 mm/rev. Finally, FIGS. 23A, 23B and 23C show chips produced at a feed rate of f=0.15 mm/rev. It is understood from these figures that the chips formed by the inventive sample A were broken in shorter lengths than those in the conventional samples with narrower widths. It is also understood that such chips formed by inventive sample A caused no loading nor clinging to the drill during perforation.

Figure 24A:
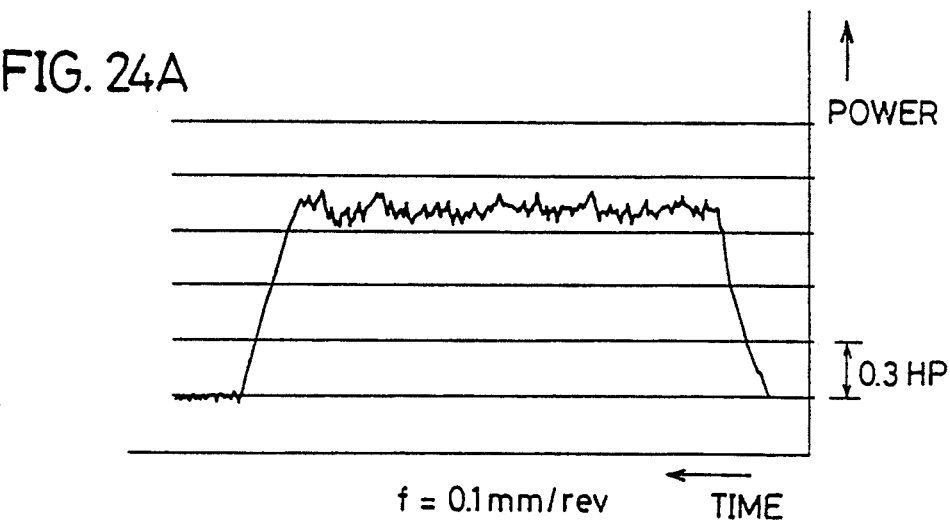
FIG. 24A is a graph showing time change in cutting power of the inventive drill measured in the comparison test for the first embodiment of the present invention at a feed rate of 0.1 mm/rev.
Figure 24B:
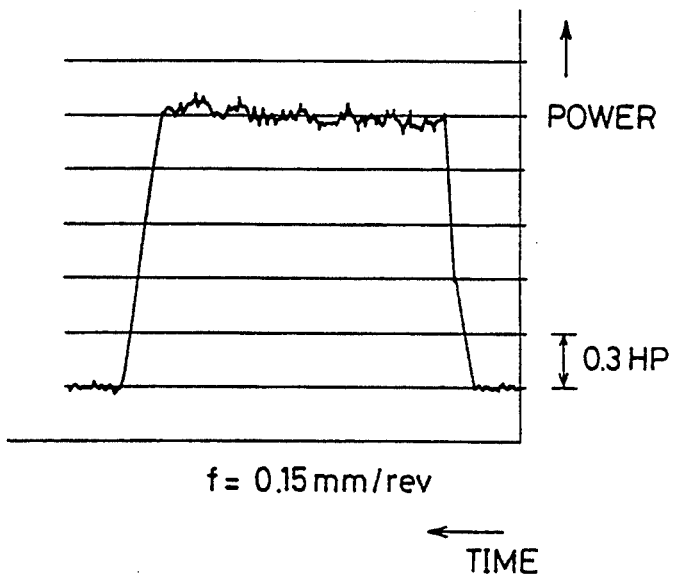
FIG. 24B is a graph showing similar time change at a feed rate of 0.15 mm/rev.
Figure 25A:
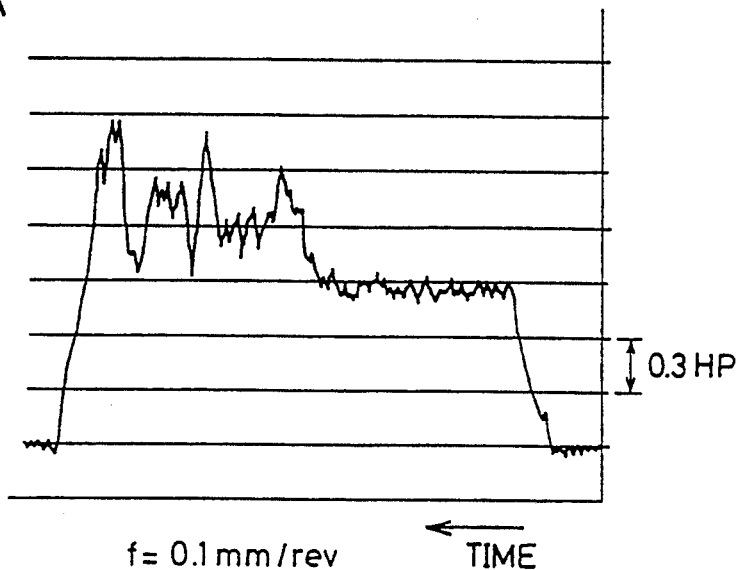
FIG. 25A is a graph showing time change in cutting power of a conventional drill measured in a test similar to those of FIGS. 24A and 24B at a feed rate of 0.1 mm/rev.
Figure 25B:
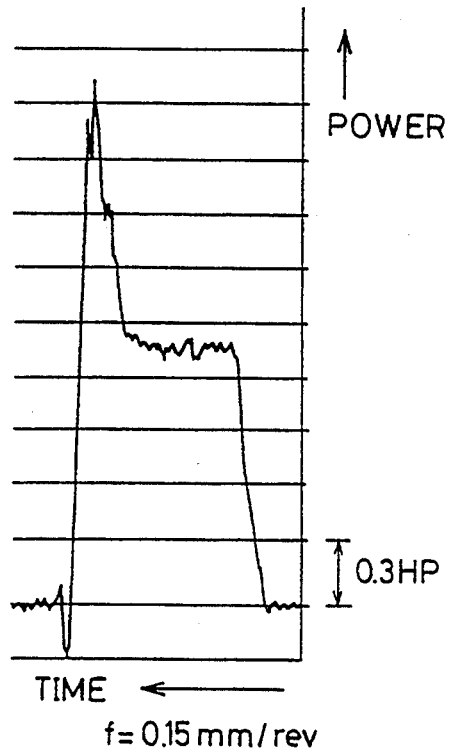
FIG. 25B is a graph showing similar time change at a feed rate of 0.15 mm/rev.

This is also clarified by a comparison of the inventive and comparative drills as to required cutting power. FIGS. 24A, 24B, 25A and 25B are illustrative of cutting power curves showing time changes in required cutting power of the inventive sample A and the conventional sample C. FIGS. 24A and 24B show the inventive sample A at feed rates of f=0.1 mm/rev. and f=0.15 mm/rev. respectively, while FIGS. 25A and 25B show the conventional sample C also at feed rates of f=0.1 mm/rev. and f=0.15 mm/rev. respectively. Comparing FIGS. 24A and 24B with FIGS. 25A and 25B, it is understood that cutting power was increased with time using the conventional sample C. This proves that chips became loaded in the drilled holes or were clinging to the drill during progress of the perforation, to increase the cutting power. On the other hand, the inventive sample A exhibits a substantially constant cutting power in relation to the time lapse during perforation. Thus, it is clearly understood that the inventive drill is hardly influenced by chip loading etc.

As hereinabove described, the drill according to the first embodiment of the present invention has linear cutting regions and curved cutting regions to finely break chips, whereby it is possible to prevent breakage of the drill as well as reduction in its power requirement which may be caused by loading or clinging of chips, thereby improving chip controllability.

A second embodiment of the present invention is now described.

Figure 26:
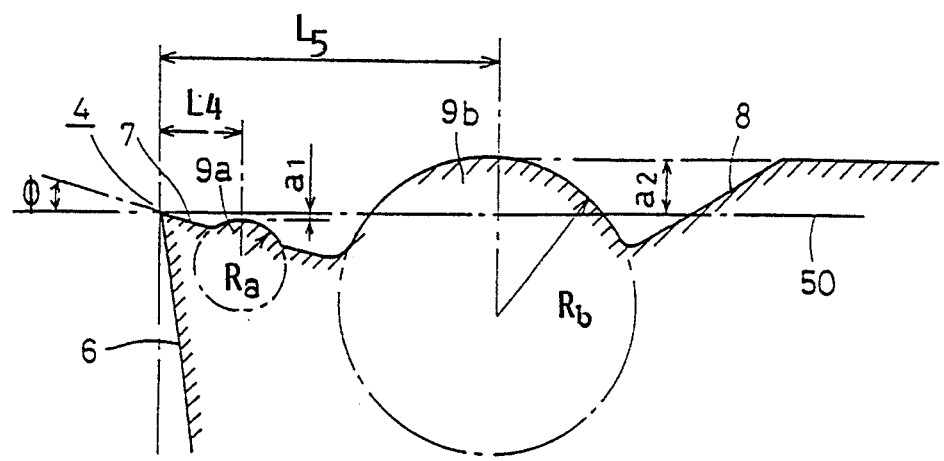
FIG. 26 is a sectional view showing the configurations of chip breakers provided in a drill according to a second embodiment of the present invention.

The description given above with reference to FIGS. 7 to 17 similarly applies to the drill according to this embodiment, which is characterized in particular by the configurations of chip breakers. The configurations of the chip breakers according to this embodiment are now described. FIG. 26 is a sectional view showing a tip configuration in a section substantially perpendicular to the direction of extension of a cutting edge in a tip portion of an insert 1. Referring to FIG. 26, a first chip breaker 9a and a second chip breaker 9b are substantially aligned in the same section. A drill rake face 7 is inclined at an angle $\theta$ with respect to a reference line 50 which is parallel to the rotation axis of the drill. The first chip breaker 9a is provided in the form of a hemisphere or segment of a sphere having a radius $R_a$ in a position separated from a cutting edge 4 by a distance $L_4$ measured along reference line 50. A protruding portion thereof is retracted from or below the reference line 50 by a distance $a_1$. On the other hand, the second chip breaker 9b is provided in the form of a hemisphere or segment of a sphere having a radius $R_b$ in a position separated from the cutting edge 4 by a distance $L_5$. A protruding portion thereof projects beyond the reference line 50 by a distance $a_2$. A chip breaking surface 8, which is oppositely inclined with respect to the inclination of the rake face 7, is formed behind the second chip breaker 9b. It has been proved through various tests that preferable dimensions relating to these chip breakers 9a and 9b are in the following ranges:

$L_4$ = 0.1 to 2 mm
$L_5$ = 0.5 to 7 mm
$a_1$ = 0 to 0.5 mm
$a_2$ = 0 to 3 mm

Further, the radii $R_a$ and $R_b$ of the first and second chip breakers 9a and 9b are about 0.6 mm and 2.8 mm respectively, for example.

Figure 27:
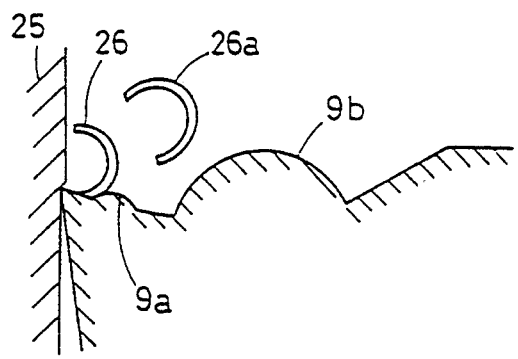
FIG. 27 is a diagram illustrating the action of the chip breakers in a low feed rate region.
Figure 28:
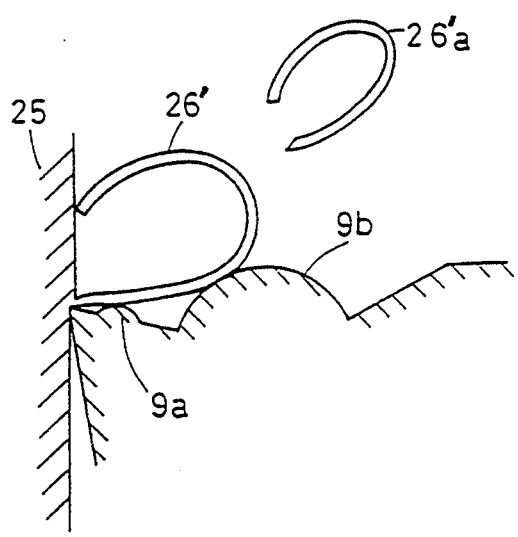
FIG. 28 is a diagram illustrating the action of the chip breakers in a high feed rate region.

Functions of the chip breakers are now described. FIGS. 27 and 28 illustrate the functions of the chip breakers in relation to a drill which is driven at different feed rates. As shown in FIG. 27, each chip 26 is bent by the first chip breaker 9a in a low feed region at a feed rate f of 0.01 to 0.2 mm/rev., and cut into a fine chip 26a.

Referring to FIG. 28, each chip 26' comes into contact with the second chip breaker 9b in addition to and beyond the first chip breaker 9a in an intermediate or high feed region at a feed rate f of 0.1 to 0.6 mm/rev., whereupon chip 26' is curved by the second chip breaker 9b, and cut into a chip 26'a which is slightly larger than that chip 26a shown in FIG. 27. Thus, the chip breakers 9a and 9b are so provided that the chips come into contact with the surfaces thereof, whereby constant resistance between the chips and the rake face of the drill is reduced to reduce overall cutting resistance of the drill.

The results of a cutting test of the drill according to this embodiment are now described.

Figure 29:
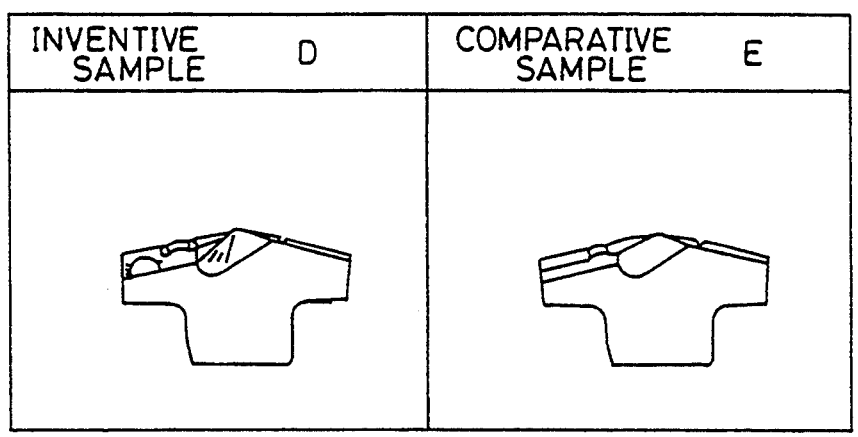
FIG. 29 is a schematic diagram illustrating the configurations of the inventive drill and a comparative drill employed in a comparison test in relation to the second embodiment of the present invention.

FIG. 29 shows the configurations of an inventive sample drill insert D and a comparative sample drill insert E employed in this cutting test, and Table 2 shows conditions of the cutting test:

TABLE 2

| Workpiece | S50C |
|---|---|
| Cutting Speed | V = 60 m/min. |
| Feed Rate | f = 0.05 to 0.15 mm/rev. |
| Drilled Hole | $\phi$22 × 38 mm in depth |
| Cutting Liquid | emulsion type |

Figure 30:
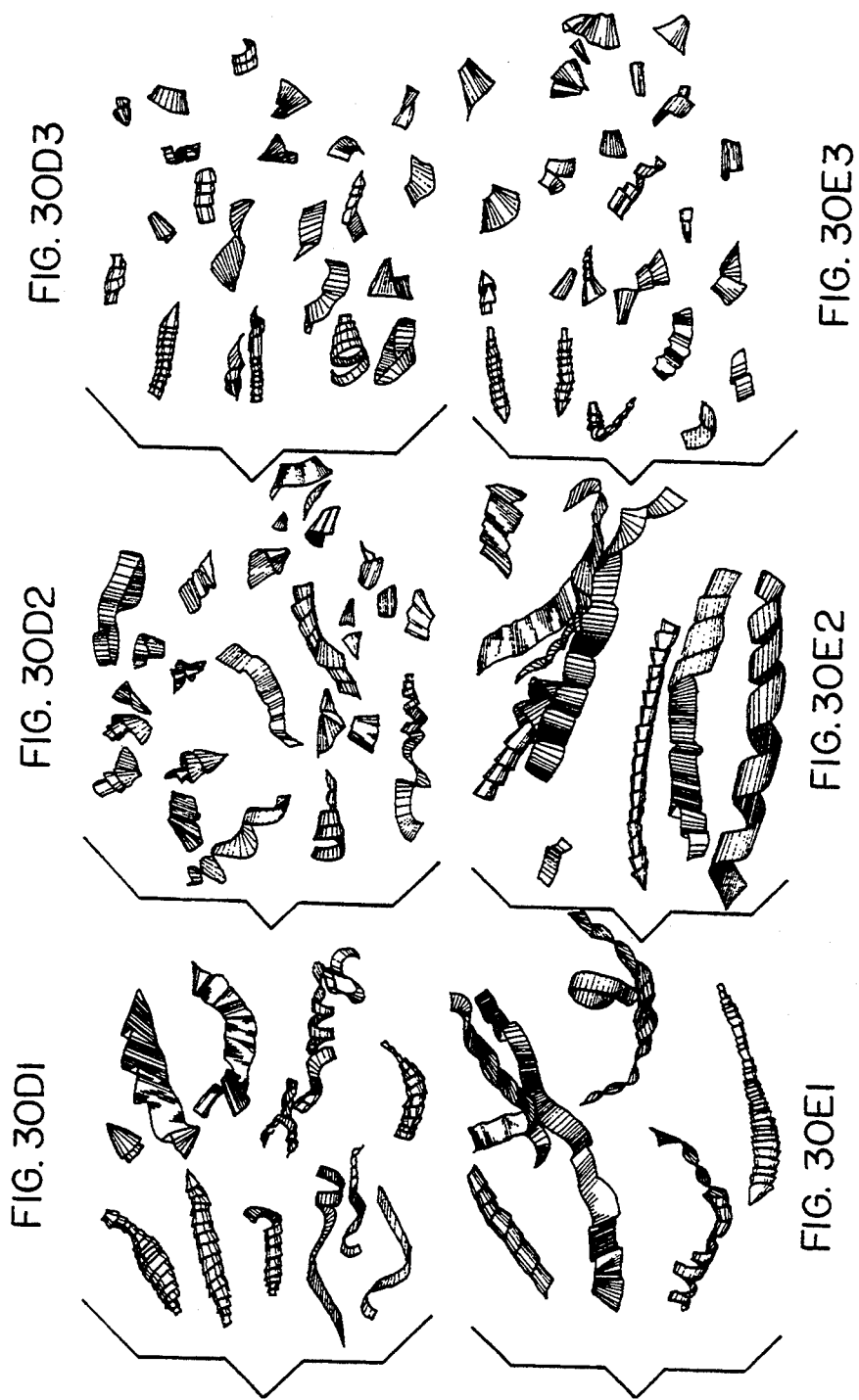

FIG. 30 shows several views of different chips resulting from this cutting test. Thereby FIGS. 30D1, 30D2 and 30D3 show chips produced by the inventive sample D at feed rates of f=0.05 mm/rev., f=0.1 mm/rev. and f=0.15 mm/rev. respectively. FIGS. 30E1, 30E2 and 30E3 show chips produced by the comparative sample E at feed rates of f=0.05 mm/rev., f=0.1 mm/rev. and f=0.15 mm/rev. respectively. It is understood from FIG. 30 that chips formed by the inventive sample D are finely parted as compared with those formed by the comparative sample E having no chip breakers. The chips are more finely parted in a low feed region at a feed rate f of 0.05 to 0.1 mm/rev. by the function of the first chip breaker 9a having a small projection.

Although a single cutting edge 4 has two first chip breakers 9a and one second chip breaker 9b in the aforementioned embodiment, the present invention is not restricted to this structure but may have more chip breakers. Further, the first and second chip breakers may be linearly aligned with respect to the direction of chip formation.

According to this embodiment, as hereinabove described, the rake faces of the drill are provided with projections for breaking chips, whereby the chips are so finely parted that it is possible to prevent deterioration of chip controllability which may be caused by clinging or loading of such chips.

A third embodiment of the present invention is now described.

The description given above with reference to FIGS. 7 to 17 similarly applies to the drill according to this embodiment, which is characterized in particular in that the configuration of a throat 11 (see FIG. 10) of an insert 1 is so optimized as to improve the strength of the insert 1.

Figure 31:
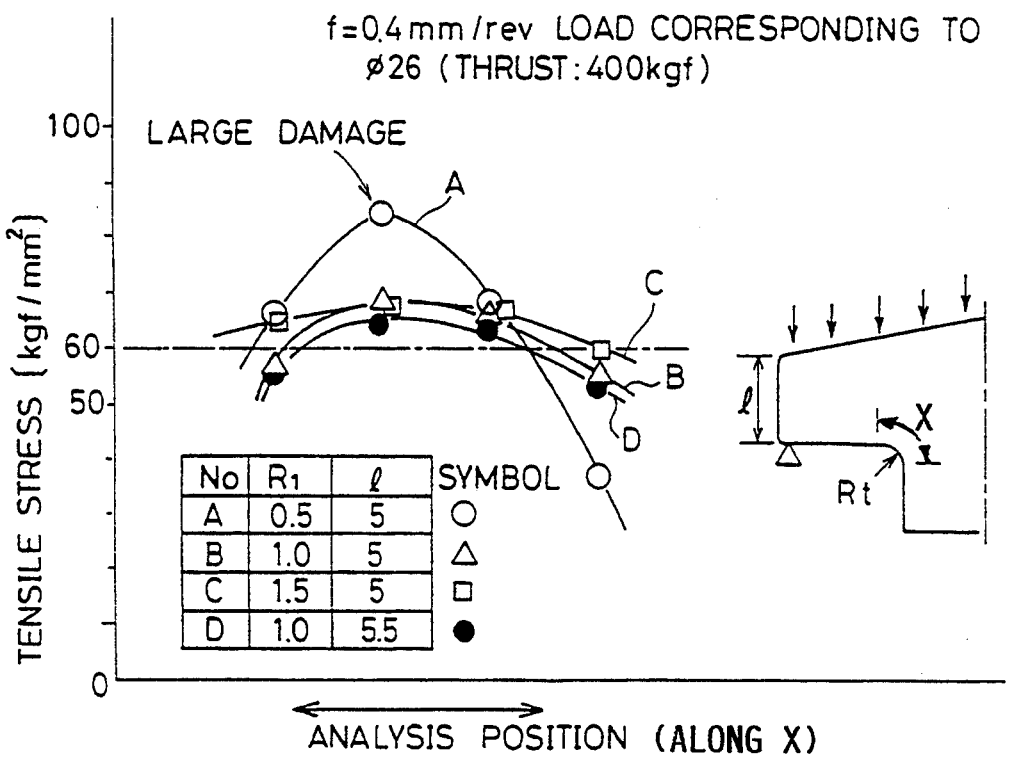
FIG. 31 is a graph illustrating lines of stress of inserts in a third embodiment of the present invention, employing a finite element method.

FIG. 31 is a graph of lines of stress showing the degrees of stress concentration caused in samples of such a throat 11 analyzed through a finite element method employing radii $R_t$ of the throat 11 as parameters. FIG. 31 also shows an analysis model on the right side of the figure. From the results shown in FIG. 31, it is understood that stress concentration at the throat 11 is relieved when the radius $R_t$ of curvature thereof exceeds 0.5 mm, to attain relatively flat stress distribution along an analysis curve X. It is also understood that no remarkable change occurs in such a relieved state of the stress concentration when the radius $R_t$ of curvature exceeds 1 mm, for example.

Figure 32:
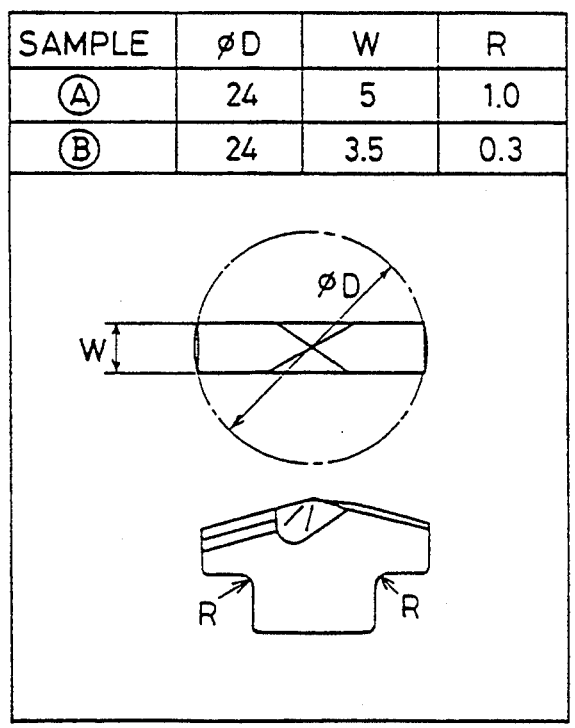
FIG. 32 illustrates the configurations of drills employed in a cutting test in relation to the third embodiment of the present invention.

Samples of drills were prepared with inserts having different radii of curvature of throats 11, to be subjected to a cutting test. FIG. 32 shows the configurations of the samples, and Table 3 shows conditions for the cutting test.

TABLE 3

| Workpiece | S50C (HB230) |
|---|---|
| Cutting Speed | 100 m/min. |
| Feed Rate | 0.1–0.4 mm/rev. |

Table 4 shows the results of the cutting test.

TABLE 4

| Sample | Feed Rate: mm/rev. (Thrust: kgf) | | | |
| --- | --- | --- | --- | --- |
| | 0.1 mm/rev. (150 kgf) | 0.2 mm/rev. (300 kgf) | 0.3 mm/rev. (450 kgf) | 0.4 mm/rev. (600 kgf) |
| B | 0 | 0 | X (broken) | |
| A | 0 | 0 | 0 | 0 |

From the results in Table 4, it is understood that the drill can withstand a large thrust when the radius of curvature of the throat 11 is increased in the insert 1. It has been proved from the results of the test that preferable ranges of a width W of a substantially T-shaped insert and a radius $R_t$ of curvature of its throat are as follows:

$$0.15D \leq W \leq 0.5D \text{ (D: outer diameter of the drill)}$$

$$0.3 \text{ mm} \leq R_t \leq 5 \text{ mm}$$

According to this embodiment as hereinabove described, the shank and the insert are connected with each other in the self-grip system while the throat of the insert is machined in the form of a circular arc, whereby it is possible to relieve stress concentration with respect to an axial thrust during operation of the drill, thereby increasing the tool strength.

A fourth embodiment of the present invention is now described.

The description given above with reference to FIGS. 7 to 17 similarly applies to the drill according to this embodiment, which is characterized in particular in that the configurations of thinning surfaces 10 of an insert 1 are so optimized as to increase the strength of the insert 1.

Figure 33:
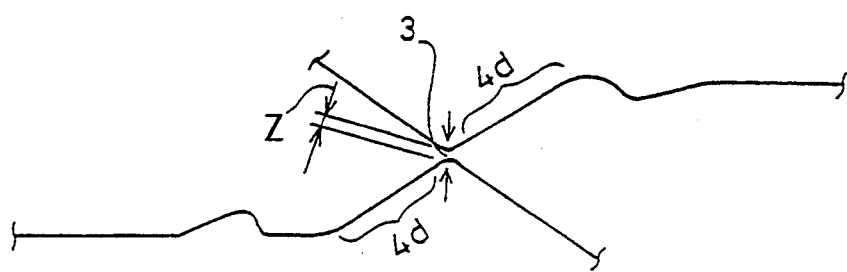
FIG. 33 is a partial plan view showing the configurations of cutting edges of an insert of a drill according to a fourth embodiment of the present invention.
Figure 34:
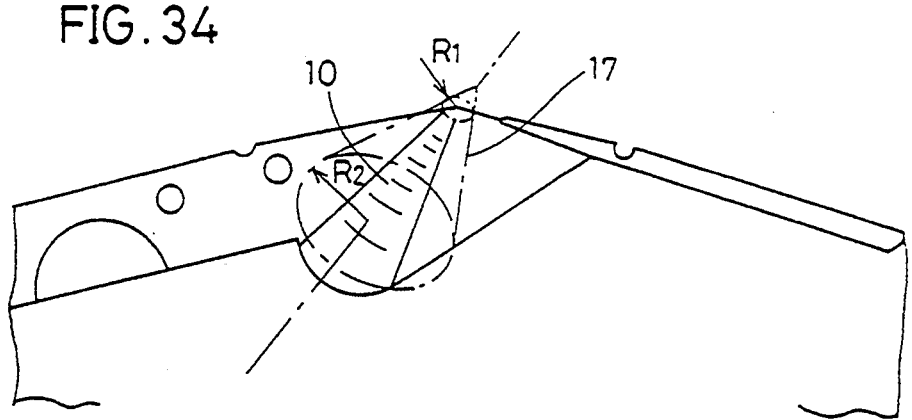
FIG. 34 is a partial front elevational view illustrating the configurations of thinned surfaces which are formed in the insert of the drill according to the fourth embodiment of the present invention.

The thinned configurations of the insert 1 according to this embodiment are now described. FIG. 33 illustrates the configurations of cutting edges, and FIG. 34 is a front elevational view of the drill tip portion, illustrating the configurations of the thinning surfaces 10. Referring to FIGS. 33 and 34, the thinning surfaces 10 are formed on rake-face sides of a pair of cutting central regions 4d along a chisel edge 3. The thinning surfaces 10 are formed along the side surface of a truncated cone 17 which is so placed that its pointed projecting end is directed toward the chisel edge 3. Such thinned configurations using parts of the side surface of the truncated cone 17 are adapted to reduce curvatures of the cutting central regions 4d on the chisel edge sides while reducing a chisel width Z, thereby improving sharpness of the drill. Further, the strength of the insert 1 is improved by increasing curvatures at the rear portions of the cutting edges.

Regarding the radii $R_1$ and $R_2$ of curvature of the conical thinning surfaces 10 at the forward and rear portions of the insert, preferable ranges are as follows:

$$0.1 \text{ mm} < R_1 < 3 \text{ mm}$$

$$0.5 \text{ mm} < R_2 < 10 \text{ mm}$$

According to this embodiment, as hereinabove described, the thinning surfaces defining the side surface of the truncated cone are formed with small and large radii of curvature on the forward and rear portions of the insert, thereby improving sharpness of the drill while ensuring strength of the tip portion.

A fifth embodiment of the present invention is now described.

Figure 9:
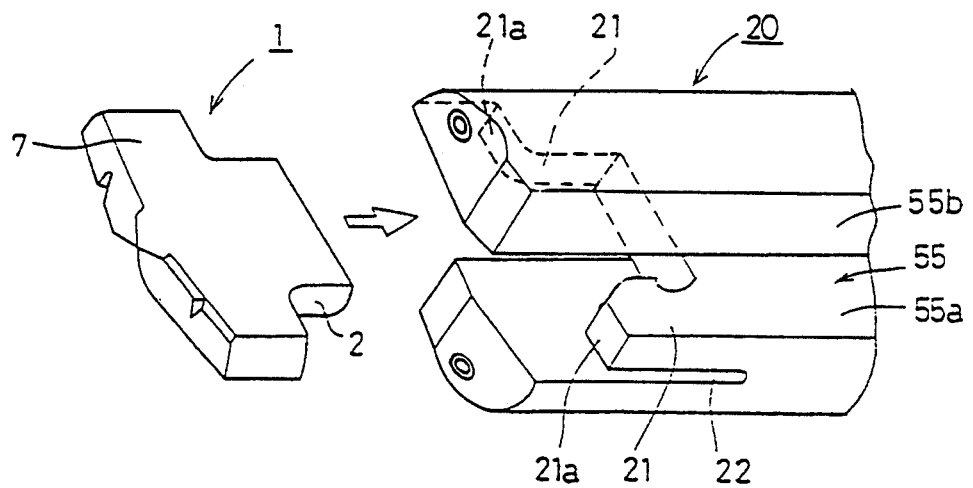
FIG. 9 is an exploded perspective view showing a method of connecting an insert with a shank.

This embodiment relates to means for preventing separation of the insert 1 from the shank 20 in the throw-away tipped drill shown in FIGS. 7 to 9.

The shank 20 has regions called chip pockets 55 (see FIG. 8) for discharging chips. Each chip pocket 55 forms a space enclosed by chip discharge surfaces 55a and 55b (see FIG. 9), so that the chips formed by the insert 1 are discharged along the chip pocket 55 in the axial direction of the shank 20.

In the aforementioned throw-away tipped drill, the insert 1 may disadvantageously be separated from the shank 20 when the drill is extracted from a perforated workpiece or released from a state of biting into a workpiece. The insert 1 is not separated from the shank 20 during the drilling operation because the insert 1, which is held by elastic force of the holding portion 21 of the shank 20, is subjected to a reactive force from the workpiece pressing it against the shank 20. However, when an external force acts in such a direction to pull the insert 1 away from the shank 20, the aforementioned problem of separation can occur because the drill is not provided with a structure for sufficiently resisting against such external force.

Further, each chip pocket 55 is substantially flush with each rake face 7 of the insert 1 to axially extend along the shank 20. Due to such structure of the chip pocket 55, the chips may cling to the outer periphery of the shank 20, to cause chip loading.

This embodiment is directed to a throw-away tipped drill that comprises means for solving such problems. The structure of this embodiment is now described with reference to FIGS. 35A to 42.

Figure 35A:
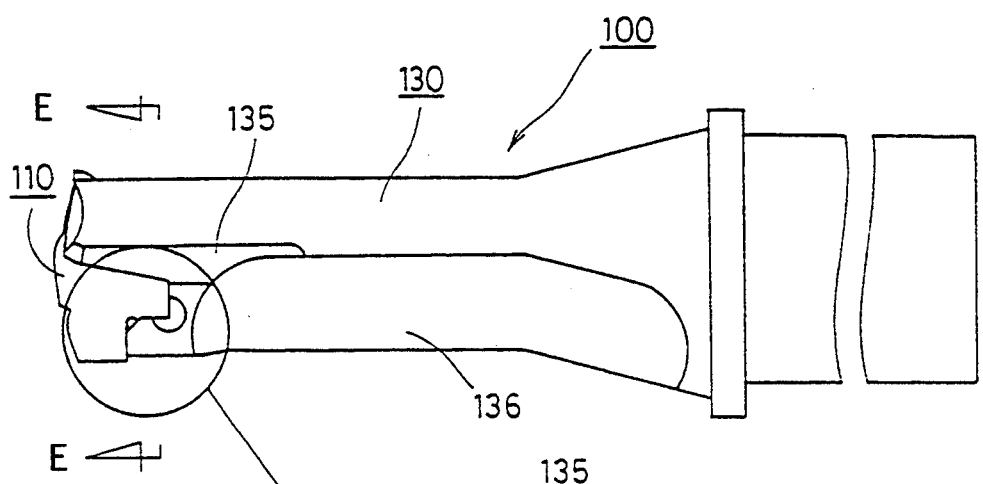
FIG. 35A is a front elevational view showing a throw-away tipped drill according to a fifth embodiment of the present invention.
Figure 35B:
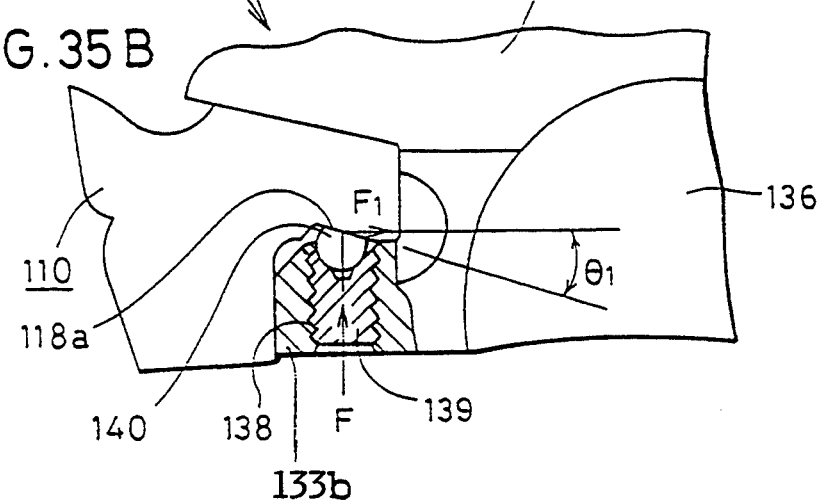
FIG. 35B is a partially fragmented front elevational view showing a part of the throw-away tipped drill in an enlarged manner.
Figure 36:
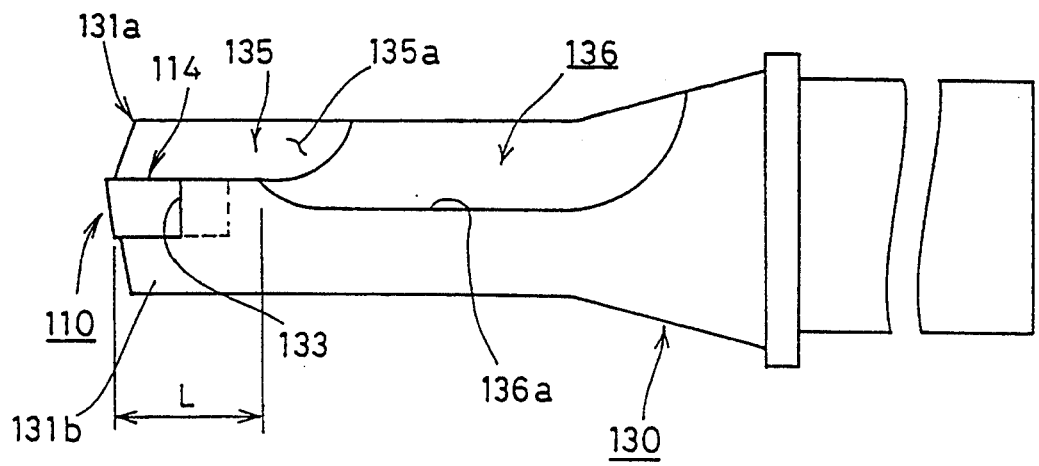
FIG. 36 is a plan view of the throw-away tipped drill shown in FIG. 35A.
Figure 37:
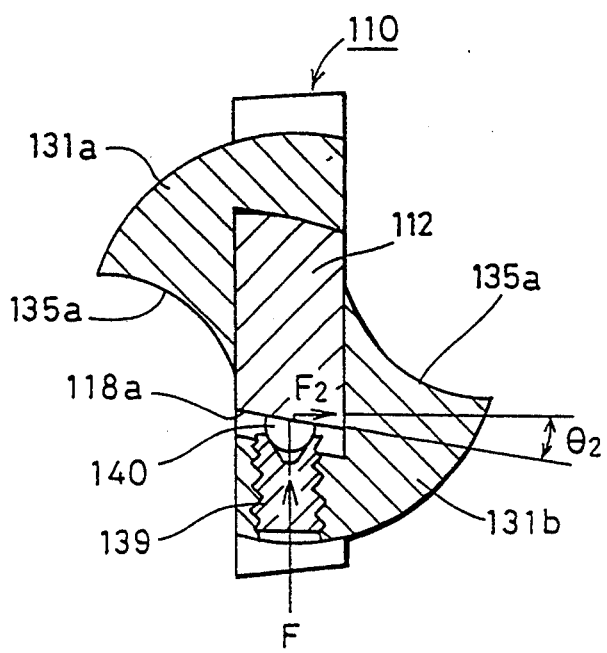
FIG. 37 is sectional view taken along the line III—III in FIG. 35A.
Figure 38:
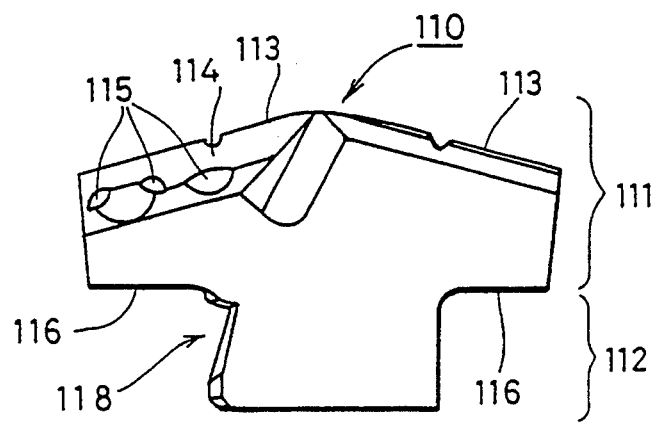
FIG. 38 is a front elevational view showing the insert of the throw-away tipped drill according to the fifth embodiment of the present invention.
Figure 39:
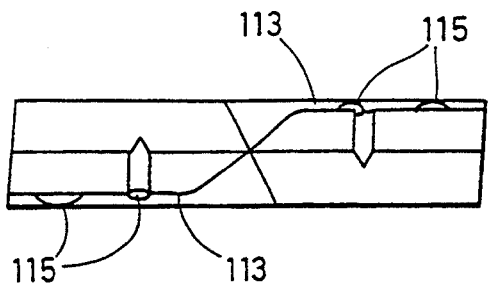
FIG. 39 is a top plan view of the insert shown in FIG. 38.
Figure 40:
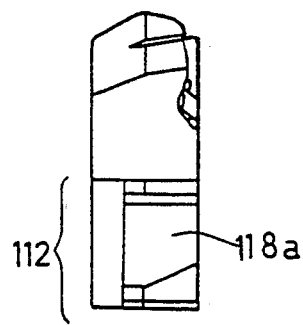
FIG. 40 is a right side elevational view of the insert shown in FIG. 38.
Figure 41:
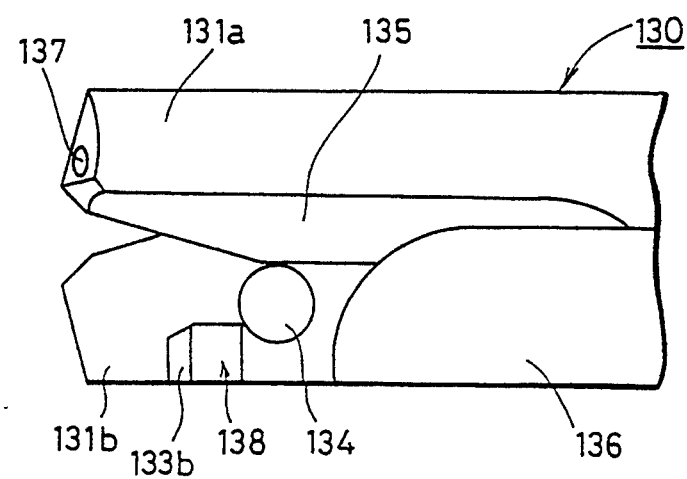
FIG. 41 is a partial front elevational view showing a shank of the throw-away tipped drill according to the fifth embodiment of the present invention.
Figure 42:
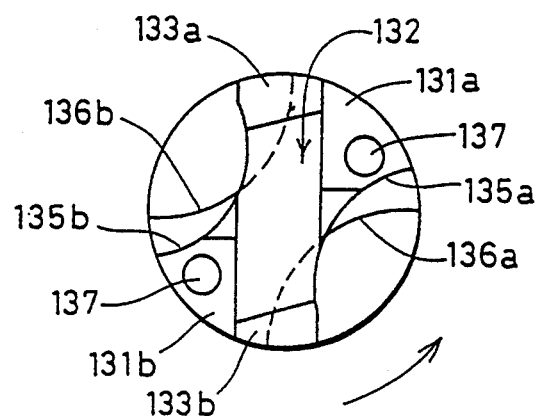
FIG. 42 is a left side elevational view of the shank shown in FIG. 41.

FIG. 35A is a front elevational view showing the throw-away tipped drill according to this embodiment, and FIG. 35B is a partially fragmented view showing a part thereof in an enlarged manner. FIG. 36 is a plan view showing the throw-away tipped drill of FIG. 35A. FIG. 37 is a sectional view taken along the line E—E in FIG. 35A. FIGS. 38 to 40 are respectively a front elevational view, a plan view and a side elevational view showing an insert. FIG. 41 is a front elevational view showing a shank, and FIG. 42 is a left side elevational view showing the shank of FIG. 41. A throw-away tipped drill 100 according to this embodiment comprises an insert 110, and a shank 130 which detachably holds the insert 110.

Referring to FIGS. 38 to 40, the insert 110 is formed as a substantially T-shaped flat plate including a tip portion 111, which is provided with cutting edges 113, and a held portion 112, which is held between holding portions 131a and 131b of the shank 130 (FIG. 41). The cutting edges 113 are arranged at positions that are substantially uniformly circumferentially spaced about the rotation axis of the drill 100. For example, in this embodiment the cutting edges 113 are arranged at about 180° from each other respectively. A pair of rake faces 114 are provided with projecting chip breakers 115. A throat of the insert 110 extends into contact surfaces 116, which are supported when the insert 110 is connected to the shank 130. A notch 118 is provided on one side surface of the held portion 112 of the insert 110. A notched surface 118a is formed in the notch 118 in constant inclination with respect to the rotation axis of the drill 100. The function of this notched surface 118a is described later.

Referring to FIGS. 41 and 42, the shank 130 includes the pair of holding portions 131a and 131b referred to above, and another pair of holding portions 133a and 133b, which are perpendicular to the holding portions 131a and 131b, for holding the insert 110, in order to define an insert receiving space 132 for receiving the held portion 112 of the insert 110. The upper surfaces of the holding portions 133a and 133b define support surfaces to be in contact with the contact surface 116 of the insert 110, thereby supporting the same. Coolant supply holes 137 are formed in the forward ends of the pair of holding portions 131a and 131b. The holding portion 133b is provided with a through screw hole 138 communicating with the insert receiving space 132. Further, an insert washer rest 134 is provided on a position continuous to the side surface of the holding portion 133b. First and second chip pockets 135 and 136 are provided along the axial direction of the shank 130. The structures of these chip pockets 135 and 136 are described later.

Referring to FIGS. 35A to 37, the structure according to this embodiment for preventing separation of the insert 110 is now described. A male screw 139 is screwed into the through screw hole 138, which is provided in the holding portion 133b of the shank 130. The insert 110 is so connected to the shank 130 that its notched surface 118a faces the through screw hole 138. A substantially semispherical pressing member 140 is inserted between the male screw 139 and the notched surface 118a of the insert 110. As shown in FIGS. 35A and 35B, the notched surface 118a of the insert 110 is formed at a prescribed angle $\theta_1$ with respect to the rotation axis of the drill 100. This angle $\theta_1$ is set at 10° to 20°. The male screw 139 is so screwed that component force $F_1$ derived from pressing force F of the male screw 139 acts on the inclined notched surface 118a to press the insert 110 against the shank 130 in a direction along the rotational axis of the drill 100. Thus, connection strength between the insert 110 and the shank 130 is increased. When an external force acts on this arrangement of components to separate the insert 110 from the shank 130, the pressing member 140 comes into contact with and presses against the notched surface 118a of the insert 110 due to the pressing force of the male screw 139 through the pressing member 140, thereby preventing the insert 110 from separation.

Referring to FIG. 37, the notched surface 118a of the insert 110 is inclined at a prescribed angle $\theta_2$ with respect to a direction perpendicular to the longitudinal direction of the insert 110. This angle $\theta_2$ is preferably set at about 3° to 10°. Such an inclination angle $\theta_2$ of the notched surface 118a causes component force $F_2$ derived from the tightening force F of the male screw 139, whereby the held portion 112 of the insert 110 is strongly pressed against the inner surfaces of the holding portions 131a and 131b of the shank 130, so that the connection strength between the insert 110 and the shank 130 is improved.

In the aforementioned structure for preventing separation of the insert 110, the pressing member 140 is not restricted to a semispherical form or other partial spherical form but may alternatively be in a spherical form. Further, the forward end of the male screw 139 may be directly brought into contact with the notched surface 118a of the insert 110, and the pressing member 140 may be omitted. Since such a separation preventing structure formed by the male screw 139 or the pressing member 140 is mainly adapted to prevent separation of the insert 110, it is not necessary to increase the pressing force of the male screw 139 against the notched surface 118a.

Figure 43:
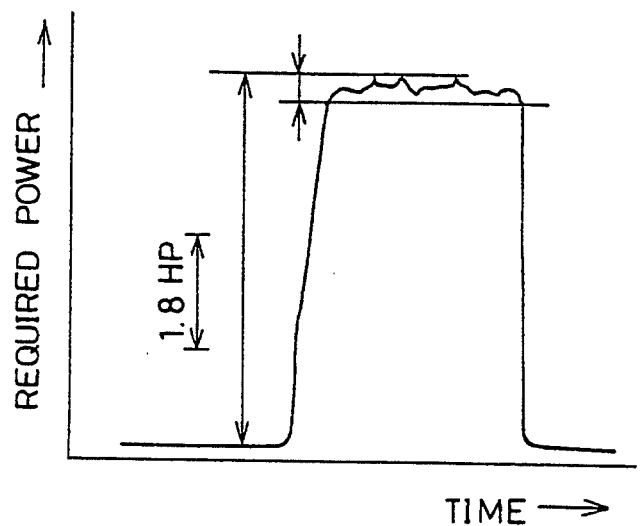
FIG. 43 is a graph showing time change of power in the inventive throw-away tipped drill employed for perforation in a cutting test in relation to the fifth embodiment of the present invention.
Figure 44:
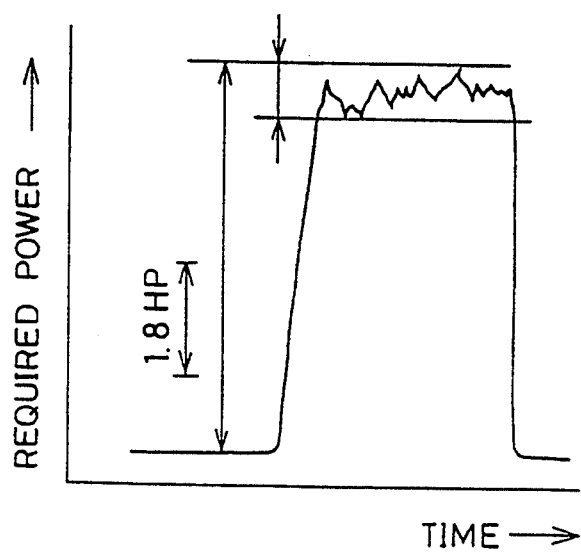
FIG. 44 is a graph showing time change of power in a conventional throw-away tipped drill employed for perforation in the cutting test in relation to the fifth embodiment of the present invention.

The structures of the chip pockets are now described. As shown in FIGS. 35A, 35B and 36, the drill 100 according to this embodiment is provided with the first and second chip pockets 135 and 136 in the shank 130. The first chip pocket 135 is formed along the axial direction of the shank 130 from the forward ends of the holding portions 131a and 131b, and each of its chip discharge surfaces 135a is formed by a part of a cylindrical surface having a constant curvature. The second chip pocket 136 extends along the axial direction of the shank 130 to be substantially continuous to the rake faces 114 of the insert 110, and each of its chip discharge surfaces 136a is hollowed from each rake face 114 of the insert 110 in a direction reverse to the rotational direction of the drill 100. As shown in FIG. 42 in particular, the chip discharge surfaces 135a and 136a of the first and second chip pockets 135 and 136 have curved surfaces which are formed by parts of cylindrical side surfaces, while the chip discharge surface 136a of the second chip pocket 136 is additionally twisted to be retracted in a direction reverse to the rotational direction of the drill 100. The second chip pocket 136 is located to begin at a position separated by a distance L from the forward end of the shank 130 along the rotation axis (see FIG. 36). This distance L is preferably about 0.5 times to twice the drill diameter. The chip pockets 135 and 136 are thus formed in two stages along the rotation axis of the drill 100 so that the second chip pocket 136 is retracted in the anti-rotational direction from the rake faces 114 of the insert 110, whereby the chips are smoothly discharged and prevented from chip loading during perforation. FIGS. 43 and 44 respectively illustrate fluctuations of required power in the inventive drill having chip pockets of two stages and a conventional drill having a chip pocket of one stage. It is clearly understood from FIGS. 43 and 44 that only small fluctuation of the required power is caused by chip loading in the inventive drill.

In the throw-away tipped drill according to the present invention, as hereinabove described, engaging means for preventing separation of the insert are provided between the insert and the shank, whereby it is possible to prevent separation of the insert when the drill is extracted from a workpiece after completed perforation.

Further, the chip discharge surfaces include portions continuous to the rake faces of the insert and the portions retracted in a direction opposite to the rotation of the drill, whereby it is possible to smoothly discharge the chips for preventing chip loading.

A sixth embodiment of the present invention is now described.

This embodiment relates to an improvement in a lock screw which is employable as engaging means for the fifth embodiment. The structure of the lock screw according to this embodiment is now described with reference to FIGS. 45 to 47.

Figure 45:
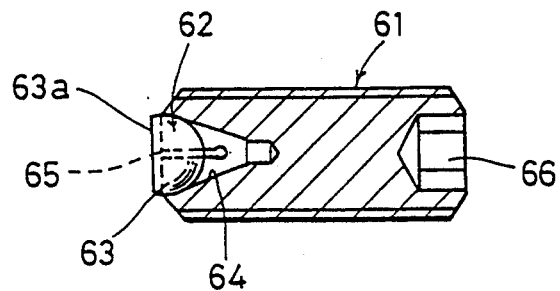
FIG. 45 is a longitudinal sectional view showing a lock screw according to a sixth embodiment of the present invention.
Figure 46:
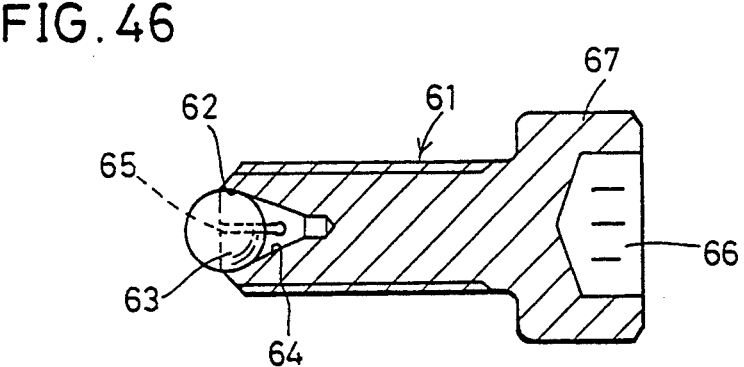
FIG. 46 is a longitudinal sectional view showing the lock screw provided with a head portion on its rear portion.

As shown in FIGS. 45 and 46, a ball or spherical segment 63 is rotatably engaged in a washer groove 62 provided in a front surface of a lock screw 61, while the outer edge or lip of the washer groove 62 is slightly narrowed to prevent displacement of the ball 63.

A tapered hole 64 is formed on a bottom side of the washer groove 62 and is rearwardly reduced in diameter, so that a spherical surface of the washer groove 62 at the outer end of this hole 64 receives the ball 63 when the same is not loaded. The lock screw 61 is provided with an expanding slot 65, which longitudinally extends from its front surface along the portion provided with the tapered hole 64, to circumferentially divide the forward end of the lock screw 61 into a plurality of parts.

If the lock screw 61 has a small diameter, its forward end may sufficiently be divided into two parts. If the lock screw 61 has a large diameter, on the other hand, it is preferable to increase the number of expanding slots to facilitate elastic formation of the forward end of the lock screw 61.

While a wrench such as an allen-type wrench must be engaged with a wrench hole 66 on the rear surface of the lock screw 61 shown in FIG. 45 to rotate the same, a head portion 67 may be provided on the rear part of the lock screw 61 as shown in FIG. 46 in a non-circular form such as a polygonal form, for example, so that the lock screw 61 is driven by an externally appliable wrench.

The ball 63 may have a flat contact surface 63a as shown in FIG. 45, or the same may be formed as a complete sphere as shown in FIG. 46, depending on the usage of the lock screw 61.

Figure 47:
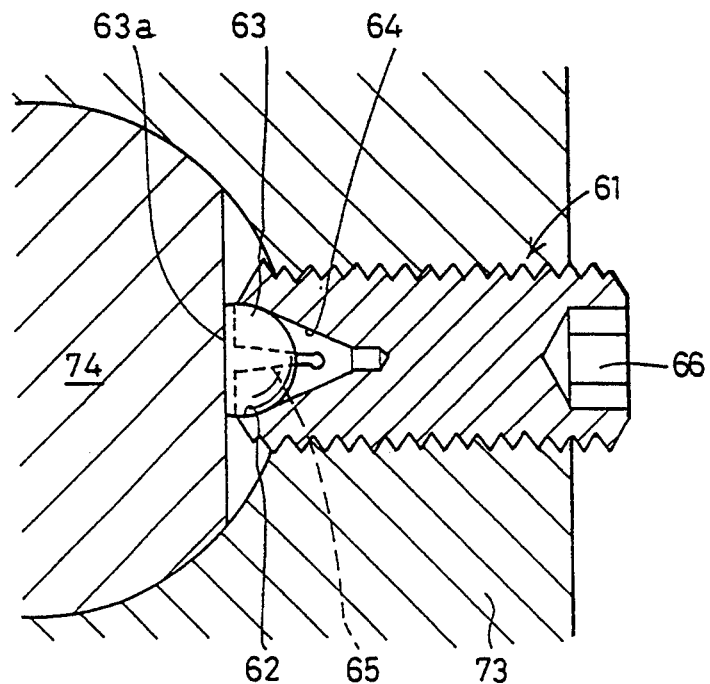
FIG. 47 is a sectional view showing an exemplary operating arrangement of the lock screw shown in FIG. 45.

As shown in FIG. 47, the lock screw 61 according to this embodiment is screwed into a screw hole of a fixed member 73 to fix a counter member 74 under pressure by means of the ball 63. At this time, the ball 63 is so pressed into the tapered hole 64 as to enlarge the diameter of the forward end of the screw 61, which is provided with the expanding slot 65, due to the resulting wedge effect, thereby bringing the screw 61 tightly into contact with the inner surface of the screw hole. Thus, strong frictional force is caused between the outer periphery of the forward end of the lock screw 61 and the inner surface of the screw hole after the lock screw 61 is fastened, to prevent looseness which may be caused by vibration or the like, thereby maintaining the counter member in a stable fixed state.

In the lock screw according to this embodiment, the ball provided on its forward end serves as a wedge to enlarge the diameter of the forward end thereby attaining self locking due to frictional force which is caused between the lock screw and the screw hole. Thus, it is possible to apply the lock screw according to this embodiment to an element that requires locking without reducing a protective effect for and a locking effect of the lock screw nor disabling repeated application thereof.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A throw-away tipped drill, comprising a shank to be mounted on a cutting machine and an insert being separably mechanically connected to said shank for cutting a workpiece, said insert comprising a received portion to be mounted in said shank, said shank comprising a holding portion including a threaded through bore for receiving and holding said received portion of said insert, said throw-away tipped drill further comprising an engaging device received in said shank for engaging said insert and said shank for preventing separation of said insert from said shank, wherein said engaging device comprises a ball-type pressing member and an engaging member having a male screw to be screwed into said threaded through bore, said male screw having a washer groove on its forward end, said ball-type pressing member being rotatably received in said washer groove for pressing against said insert.

2. The throw-away drill in accordance with claim 1, wherein said insert further comprises a cavity being formed in said received portion of said insert, and wherein said ball-type pressing member of said engaging member engages with said cavity of said insert.

3. The throw-away drill in accordance with claim 2, wherein said insert comprises a pair of cutting edges on a forward end of said insert, said pair of cutting edges extending substantially radially outwardly from the center of a drill rotation axis, said pair of cutting edges being arranged at positions substantially uniformly circumferentially spaced about said drill rotation axis, and said insert further comprises a rake face having a projection for breaking chips.

4. The throw-away drill in accordance with claim 3, wherein a plurality of said chip breaking projections are formed along said rake face in a direction substantially parallel to the direction of extension of said cutting edges.

5. The throw-away drill in accordance with claim 3, further comprising a secondary chip breaking projection in said rake face having a larger radius of curvature than the first said chip breaking projection, and wherein the first said chip breaking projection is formed in a position closer to said cutting edges than said secondary chip breaking projection.

6. The throw-away drill in accordance with claim 5, wherein a projecting end of the first said projection is retracted toward a side of said rake face with respect to a virtual reference line passing through a respective said cutting edge and extending parallel to said drill rotation axis, and wherein a projecting end of said secondary projection projects beyond said virtual reference line.

7. The throw-away drill in accordance with claim 2, wherein said insert further comprises a rake face and said shank further comprises a chip discharge surface extending continuously to said rake face and extending substantially in an axial direction of said shank, and wherein said chip discharge surface includes a portion that is retracted from said rake face oppositely to a rotational direction of said drill.

8. The throw-away drill in accordance with claim 2, wherein said male screw comprises a lock screw having a cylindrical configuration with a male threading formed on an outer peripheral surface of said cylindrical configuration, a tapered hole in said lock screw on a bottom side of said washer groove, said tapered hole having a diameter that increases toward said washer groove, and an expanding slot provided at said forward end of said lock screw for circumferentially dividing into sections said washer groove and at least part of said tapered hole.

9. The throw-away drill in accordance with claim 2, wherein said male screw further comprises a wrench hole arranged at a rearward end of said male screw opposite said forward end, whereby said wrench hole may be engaged with a wrench for rotating said male screw.

10. The throw-away drill in accordance with claim 2, wherein said male screw further comprises a head portion arranged at a rearward end of said screw opposite said forward end, said head portion having a polygonal cross-section for engagement by a tool for rotating said screw.

11. A throw-away tipped drill comprising a shank to be mounted on a cutting machine and an insert being separably mechanically connected to said shank for cutting a workpiece, said insert comprising a received portion to be received in said shank, said shank comprising a holding portion for receiving and holding said received portion of said insert, said throw-away tipped drill further comprising an engaging device being received in said shank to be engaged with said insert and said shank for preventing separation of said insert from said shank, wherein said insert further comprises on its forward end a pair of first and second cutting edges extending substantially from the center of a drill rotation axis toward an outer circumferential edge of said insert, said cutting edges being arranged at positions substantially uniformly circumferentially spaced about said drill rotation axis, each of said first and second cutting edges comprising a first linear cutting region and a second linear cutting region aligned with each other on the same straight line and a curved cutting region formed between said first linear cutting region and said second linear cutting region, wherein said curved cutting regions have a first configuration formed in said first cutting edge and a second configuration formed in said second cutting edge, said first and second configurations differing from each other.

12. The throw-away drill in accordance with claim 11, wherein at least one of said curved cutting regions comprises a third linear region extending in a direction intersecting with said second linear cutting region at an angle of at least 5° and not more than 40°, and wherein the ratio of a width of said curved cutting region to a width of said second linear cutting region is at least 0.25 and not more than 3 measured along a radial direction from the center of said drill rotation axis.

13. The throw-away drill in accordance with claim 12, wherein said ratio of the width of said curved cutting region to the width of said second linear cutting region is at least ⅓ and not more than 2.

14. The throw-away drill in accordance with claim 11, wherein a groove is formed from said curved cutting region toward a rake face of said drill.

15. The throw-away drill in accordance with claim 11, wherein said curved cutting region has a circular arc region recessed behind said straight line of said first and second linear cutting regions with respect to the rotational direction of said drill.

16. The throw-away drill in accordance with claim 11, wherein said insert further comprises a rake face having a projection for breaking chips.

17. The throw-away drill in accordance with claim 16, wherein a plurality of said chip breaking projections are formed along said rake face in a direction substantially parallel to the direction of extension of said cutting edges.

18. The throw-away drill in accordance with claim 16, further comprising a secondary chip breaking projection in said rake face having a larger radius of curvature than the first said chip breaking projection and wherein the first said chip breaking projection is formed in a position closer to said cutting edges than said secondary chip breaking projection.

19. The throw-away drill in accordance with claim 18, wherein a projecting end of the first said projection is retracted toward a side of said rake face with respect to a virtual reference line passing through a respective said cutting edge and extending parallel to said drill rotation axis, and wherein a projecting end of said secondary projection projects beyond said virtual reference line.

20. The throw-away drill in accordance with claim 11, wherein said insert comprises a rake face and said shank comprises a chip discharge surface extending continuously to said rake face and extending substantially in an axial direction of said shank, and wherein said chip discharge surface includes a portion that is retracted from said rake face oppositely to a rotational direction of said drill.

21. The throw-away drill in accordance with claim 11, wherein said engaging device comprises a lock screw having a cylindrical configuration with a male threading formed on an outer peripheral surface of said cylindrical configuration, a washer groove provided on a forward end of said lock screw, a ball being rotatably engageable in said washer groove, a tapered hole provided on a bottom side of said washer groove, said tapered hole having a diameter that increases toward said washer groove, and an expanding slot provided at said forward end of said lock screw for circumferentially dividing into sections said washer groove and at least part of said tapered hole.

22. The throw-away drill in accordance with claim 21, wherein said lock screw further comprises a wrench hole arranged at a rearward end of said lock screw opposite said forward end, whereby said wrench hole may be engaged with a wrench for rotating said lock screw.

23. The throw-away drill in accordance with claim 21, wherein said lock screw further comprises a head portion arranged at a rearward end of said lock screw opposite said forward end, said head portion having a polygonal cross-section for engagement by a tool for rotating said lock screw.

* * * * *

UNITED STATES PATENT AND TRADEMARK OFFICE
CERTIFICATE OF CORRECTION

PATENT NO. : 5,338,135
DATED : August 16, 1994
INVENTOR(S) : Kazuo Noguchi et al.

It is certified that error appears in the above-identified patent and that said Letters Patent is hereby corrected as shown below:

Column 19, line 27, after "linear" insert --cutting--.

Signed and Sealed this

Twenty-fifth Day of October, 1994

*Attest:*

BRUCE LEHMAN

*Attesting Officer*     *Commissioner of Patents and Trademarks*